United States Patent
Tock et al.

(10) Patent No.: US 10,572,662 B2
(45) Date of Patent: *Feb. 25, 2020

(54) SYSTEM AND METHOD OF PROTECTING CLIENT COMPUTERS

(71) Applicant: Proofpoint, Inc., Sunnyvale, CA (US)

(72) Inventors: Theron D. Tock, Mountain View, CA (US); Michael P. Horn, San Carlos, CA (US)

(73) Assignee: PROOFPOINT, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/186,200

(22) Filed: Nov. 9, 2018

(65) Prior Publication Data

US 2019/0080088 A1    Mar. 14, 2019

Related U.S. Application Data

(63) Continuation of application No. 14/079,565, filed on Nov. 13, 2013, now Pat. No. 10,223,530.

(51) Int. Cl.
 *G06F 21/56* (2013.01)

(52) U.S. Cl.
 CPC .................. *G06F 21/56* (2013.01)

(58) Field of Classification Search
 CPC ............... G06F 21/56; H04L 2463/144; H04L 2463/146
 USPC .............................................. 726/23, 25, 26
 See application file for complete search history.

(56) References Cited

U.S. PATENT DOCUMENTS

| | | | |
|---|---|---|---|
| 6,408,391 B1 | 6/2002 | Huff et al. | |
| 7,293,063 B1 | 11/2007 | Sobel | |
| 7,620,989 B1 | 11/2009 | Couturier et al. | |
| 8,095,964 B1 * | 1/2012 | Zhong | G06F 21/56 726/4 |
| 8,225,407 B1 | 7/2012 | Thrower et al. | |
| 8,499,150 B1 * | 7/2013 | Nachenberg | H04L 9/3268 713/156 |
| 8,516,583 B2 | 8/2013 | Thomas et al. | |

(Continued)

FOREIGN PATENT DOCUMENTS

WO    WO2015073054    5/2015

OTHER PUBLICATIONS

Notice of Allowance for U.S. Appl. No. 14/079,565, dated Sep. 12, 2018, 10 pgs.

(Continued)

*Primary Examiner* — Abu S Sholeman
(74) *Attorney, Agent, or Firm* — Sprinkle IP Law Group

(57) ABSTRACT

A threat response platform to act as a bridge between non-inline security programs and inline security programs. The threat response platform receives event reports, relating to client devices, from the non-inline security programs and creates incident reports for a user. The incident reports describe the event report and also additional data gathered by an active correlation system of the threat response platform. The active correlation system automatically gathers various types of data that are potentially useful to a user in determining whether the reported event is an incidence of malware operating on the client device or a false positive. The active correlation system places a temporary agent on the client device to identify indications of compromise.

20 Claims, 17 Drawing Sheets

(56) References Cited

U.S. PATENT DOCUMENTS

| | | | |
|---|---|---|---|
| 8,726,391 B1* | 5/2014 | Zhong | G06F 21/56 726/25 |
| 9,118,951 B2 | 8/2015 | Gandhi | |
| 9,160,765 B1 | 10/2015 | Mehta | |
| 9,270,691 B2 | 2/2016 | Klein | |
| 9,542,554 B1 | 1/2017 | Salsamendi | |
| 9,805,193 B1 | 10/2017 | Salsamendi | |
| 10,223,530 B2 | 3/2019 | Tock et al. | |
| 2002/0162026 A1 | 10/2002 | Neuman et al. | |
| 2003/0061507 A1 | 3/2003 | Xiong | |
| 2003/0233583 A1 | 12/2003 | Carley | |
| 2004/0044912 A1 | 3/2004 | Connary | |
| 2004/0083297 A1 | 4/2004 | Gazzetta | |
| 2004/0193923 A1* | 9/2004 | Hammond, II | H04L 41/046 726/25 |
| 2005/0235360 A1 | 10/2005 | Pearson | |
| 2006/0070130 A1 | 3/2006 | Costea et al. | |
| 2006/0101277 A1 | 5/2006 | Meenan et al. | |
| 2006/0174344 A1 | 8/2006 | Costea | |
| 2006/0294588 A1* | 12/2006 | Lahann | H04L 63/1416 726/23 |
| 2007/0006304 A1 | 1/2007 | Kramer et al. | |
| 2007/0028304 A1 | 2/2007 | Brennan | |
| 2007/0067623 A1 | 3/2007 | Ward | |
| 2007/0162976 A1* | 7/2007 | Anderson | G06F 21/577 726/25 |
| 2008/0034425 A1* | 2/2008 | Overcash | G06F 21/55 726/22 |
| 2008/0127335 A1 | 5/2008 | Khan et al. | |
| 2008/0178294 A1 | 7/2008 | Hu | |
| 2008/0229419 A1* | 9/2008 | Holostov | G06F 21/564 726/24 |
| 2009/0064334 A1* | 3/2009 | Holcomb | G06F 21/554 726/24 |
| 2009/0099988 A1 | 4/2009 | Stokes | |
| 2009/0198651 A1 | 8/2009 | Shiffer et al. | |
| 2010/0050260 A1 | 2/2010 | Nakakoji et al. | |
| 2010/0162399 A1 | 6/2010 | Sheleheda et al. | |
| 2010/0175134 A1 | 7/2010 | Ali-ahmad et al. | |
| 2010/0205014 A1 | 8/2010 | Sholer et al. | |
| 2010/0251363 A1 | 9/2010 | Todorovic | |
| 2010/0287615 A1 | 11/2010 | Martin | |
| 2010/0299754 A1 | 11/2010 | Amit | |
| 2010/0333199 A1 | 12/2010 | Gianoulakis et al. | |
| 2011/0047620 A1 | 2/2011 | Mahaffey et al. | |
| 2011/0083176 A1 | 4/2011 | Martynenko | |
| 2011/0167474 A1 | 7/2011 | Sinha | |
| 2011/0239300 A1 | 9/2011 | Klein | |
| 2011/0282997 A1 | 11/2011 | Prince et al. | |
| 2011/0320816 A1* | 12/2011 | Yao | G06F 21/316 713/171 |
| 2012/0079596 A1 | 3/2012 | Thomas et al. | |
| 2012/0084859 A1 | 4/2012 | Radinsky | |
| 2012/0110174 A1 | 5/2012 | Wootton | |
| 2012/0151033 A1 | 6/2012 | Baliga et al. | |
| 2012/0226519 A1 | 9/2012 | Copeland | |
| 2012/0240231 A1 | 9/2012 | Sohn et al. | |
| 2013/0145463 A1 | 6/2013 | Ghosh | |
| 2013/0232576 A1 | 9/2013 | Karnikis | |
| 2013/0247167 A1 | 9/2013 | Paul et al. | |
| 2013/0305368 A1 | 11/2013 | Ford | |
| 2014/0013434 A1 | 1/2014 | Ranum et al. | |
| 2014/0068774 A1 | 3/2014 | Nie | |
| 2014/0123279 A1 | 5/2014 | Bishop | |
| 2014/0283070 A1 | 9/2014 | Lewis et al. | |
| 2015/0040228 A1 | 2/2015 | Lee et al. | |
| 2015/0135316 A1 | 5/2015 | Tock | |
| 2015/0135317 A1 | 5/2015 | Tock et al. | |
| 2015/0304351 A1 | 10/2015 | Oberheide et al. | |
| 2016/0080399 A1 | 3/2016 | Harris | |
| 2016/0173509 A1 | 6/2016 | Ray | |
| 2016/0173510 A1 | 6/2016 | Harris | |
| 2017/0041888 A1 | 2/2017 | Wu | |
| 2019/0080087 A1 | 3/2019 | Tock et al. | |

OTHER PUBLICATIONS

International Search Report and Written Opinion for PCT/US14/000211, dated Feb. 13, 2015, 4 pgs.

Office Action for U.S. Appl. No. 14/079,565, dated Dec. 12, 2014, 13 pgs.

Office Action for U.S. Appl. No. 14/079,565, dated Aug. 5, 2015, 14 pgs.

Office Action for U.S. Appl. No. 14/079,565, dated May 27, 2016, 38 pgs.

Office Action for U.S. Appl. No. 14/079,565, dated Feb. 24, 2017, 43 pgs.

Supplementary European Search Report for European Patent Application No. 14862582, dated Mar. 10, 2017, 6 pgs.

Notice of Allowance for U.S. Appl. No. 14/079,565, dated Dec. 29, 2017, 13 pgs.

Notice of Allowance for U.S. Appl. No. 14/079,565, dated Sep. 12, 2018, 13 pgs.

International Search Report issued for PCT Application No. PCT/US2014/000212, dated Mar. 18, 2015, 3 pages.

Written Opinion issued for PCT Application No. PCT/US2014/000212, dated Mar. 18, 2015, 10 pages.

International Preliminary Report on Patentability issued for PCT Application No. PCT/US2014/000212, dated May 17, 2016, 11 pages.

European Search Report issued for European Patent Application No. 14862701.1, dated Mar. 17, 2017, 7 pages.

European Examination Report issued for European Patent Application No. 14862701.1, dated Apr. 26, 2019, 5 pages.

Office Action issued for U.S. Appl. No. 14/079,564, dated Sep. 8, 2015, 16 pages.

Office Action issued for U.S. Appl. No. 14/079,564, dated Jun. 22, 2016, 17 pages.

Office Action issued for U.S. Appl. No. 14/079,564, dated Feb. 7, 2017, 19 pages.

Office Action issued for U.S. Appl. No. 14/079,564, dated Sep. 27, 2017, 18 pages.

Office Action for U.S. Appl. No. 16/186,191, dated Mar. 28, 2019, 51 pgs.

Notice of Allowance for U.S. Appl. No. 16/186,191, dated Sep. 30, 2019, 5 pgs.

* cited by examiner

| Incidents | | |
|---|---|---|
| Open (7) Closed (45) | ⓘ There are incidents that require attention | |

New

13:31
July 26
2013

Incident 52 (Click for details...) ← 512     Overall Threat Score (4.5/5) ●●●●◐

Severity: ☐☐☐☐ ← 514
Event Source: FireEye ← 518
Event Type: malware-object ← 516
Responses: add IPs to 1 list: Suspicious Clients ← 520
Last Viewed By: ← 522
Matched Events: 1 Event ← 523

[ Close Incident ] ← 524    510

---

10:22
July 26
2013

Incident 51 (Click for details...) ← 512     Overall Threat Score (1.5/5) ●◐○○○

Severity: ☐☐ ← 514
Event Source: FireEye ← 518
Event Type: malware-object ← 516
Responses: add IPs to 2 lists: Demo Malware Callback Sites, Suspicious Clients ← 520
Last Viewed By: mhorn ← 522
Matched Events: 3 Events ← 523

[ Close Incident ] ← 524    510

---

9:25
July 26
2013

Incident 50 (Click for details...) ← 512     Overall Threat Score (2.5/5) ●●◐○○

Severity: ☐☐ ← 514
Event Source: FireEye ← 518
Event Type: malware-object ← 516
Responses: add IPs to 3 lists: Demo Malware Callback Sites, Demo Malware Callback Sites, Suspicious Clients ← 520
Last Viewed By: anthony ← 522
Matched Events: 2 Events ← 523

[ Close Incident ] ← 524    510

Incident 52

Overall Threat Score (4.5/5) ● ● ● ● ◐

Overview

Event Details
- Event Source: FireEye
- Event Received: 2013-07-26 13:31:44 -0700
- Event Type: malware-object
- Source Event ID: 9146
- Malware: Malware Binary
- Analysis OS: winxp-sp2
- MD5 Checksum: 5fa4248c1acf303cc6994c52df74b5ee
- Filename: Minecraft?.exe
- Application: explorer Malware
- Malware: Malware Binary
- Analysis OS: winxp-sp2
- Virus Total: Aware - 32 out of 48 AVs
- Filename: Minecraft?.exe
- Application: explorer Reputation
Geographical
History
Identity
WHOIS?
PC Information
Event Info

| Source (1) | Destination (1) | CNC (9) | URL(1) |

(Add to list...)

Address 10.10.10.22
Username: barnell
Host: GDEMOSS-WIN7-01.demo.netcitadel.com
Computer Name: GDEMOSS-WIN7-01
Domain: SALESDEMO
MAC Address: 00:16:3e:21:4e:a5

Incident History ☐ Comments Only

Identified as malware
— by mhorn Fri Jun 26 2013 13:38

Added 1 IP(s) to list Suspicious Clients ← 920
— by System Fri, Jul 26 2013 13:31

Responses

» Added 1 IP(s) to list Suspicious Clients
  by System

» Added 9 IPs to list Malware Callback ← 910
  Sites by mhorn

⊕ Add another response...

[ Close Incident ]

SYSTEM AND METHOD OF PROTECTING CLIENT COMPUTERS

CROSS-REFERENCE TO RELATED APPLICATION(S)

This is a continuation of, and claims a benefit of priority from, U.S. patent application Ser. No. 14/079,565, filed Nov. 13, 2013, entitled "SYSTEM AND METHOD OF PROTECTING CLIENT COMPUTERS," which is fully incorporated by reference herein for all purposes. This application relates to U.S. patent application Ser. No. 16/186,191, filed Nov. 9, 2018, entitled "SYSTEM AND METHOD OF PROTECTING CLIENT COMPUTERS," which is fully incorporated herein by reference for all purposes.

BACKGROUND

In the field of computer security, there are various types of programs for providing a computer or network of computers with security. One type of computer security is inline computer security such as firewall programs. Inline computer security operates as a gateway between the computers to be protected (the "protected network") and an outside network such as the Internet. In some cases, the inline computer security also operates as a gateway between computers within the protected network. The inline security determines whether a connection between the computer and a particular location (e.g., an IP address on the Internet), is allowed or forbidden. If the connection is allowed, the computer connects to the particular location. If the connection is forbidden, the computer is prevented from connecting to the particular location. In addition to inline security, there are also non-inline security programs, such as threat detector programs operating in a non-inline mode. The non-inline security programs observe the computer and/or traffic to and from the computer. If the non-inline security program detects suspicious activity, it sends an alert about the suspicious activity to a user, but may not, or in some cases cannot, block a connection or stop the suspicious activity.

SUMMARY

Some embodiments provide a threat response platform, which is a computer program and in some cases computer hardware, that facilitates communications between non-inline security programs and inline security programs (or in some embodiments between two inline security programs) in order to enhance the protection of the client devices from malware. Malware includes viruses, Trojan horse programs, and/or any other hostile programs attempting to affect the client device or any other computer in the network. The threat response platform receives event reports identifying potential instances of malware on client devices, from the non-inline security programs and creates incident reports for a user and/or anyone else with access to the threat response platform incident reports. The incident reports describe the event report and also additional data gathered by an active correlation system of the threat response platform. The active correlation system automatically gathers various types of data that are potentially useful to a user (e.g., a user of the threat response platform) and/or an analyst (e.g., one who analyzes the data collected and/or produced by the threat response platform) in determining whether the reported event is an incidence of malware operating on the client device or a false positive.

One type of data that the active correlation system gathers in some cases is data from the client device that provides indications of compromise (IOCs). The potential IOCs of some embodiments include changed or suspicious registry entries, changed or suspicious files, open network connections, processes, and/or mutexes, etc. In order to gather IOCs from a client device, the threat response platform of some embodiments places and activates an agent file (e.g., a file containing an agent program) on the client device to look for these indications of compromise. As used herein, the terms "potential indications of compromise" or "potential IOCs" refer to what the agent collects (e.g., filenames of recently added or changed files, mutexes, recently changed or added registry keys, open connections, processes, etc.) from the client device as possible signs of malware infection. The terms "actual IOC" and "identifiers of malware" are used to indicate something that the threat response platform has identified (e.g., based on an IOC database) as being evidence of malware. In some embodiments, after the agent has made a report of the potential IOCs, the agent is automatically removed from the client device.

The active correlation system of some embodiments also gathers additional data from other sources such as logs of firewalls and routers, reputational data about locations to which the computer is connected (e.g., IP addresses), the geographical location of connections (e.g., where an IP address or hostname is physically located), and other data useful in determining the status of an event.

In some embodiments, the threat response platform takes action in response to events that are determined to be malware (e.g., determined by the user or automatically). In some embodiments, the threat response platform takes action in response to events that are suspected of being malware, but not definitively determined to be malware. The threat response platform of some embodiments, for example, sends commands to the inline security (e.g., a firewall) to block suspicious connections between the computer and the network.

As an alternative to completely blocking a connection to a particular location, the threat response platform of some embodiments commands the firewall to reroute such suspicious connections through the threat response platform. Once these connections are rerouted, the threat response platform provides a test (e.g., a Turing test) to the client in order to determine whether a human is making the attempt to connect the client device to that location, or an automated system is making the attempt to connect the client device to that location. In particular, the Turing test is used to determine whether the user of the computer is a human, or whether a piece of malware that has an automated system is trying to connect to the location. Therefore, when the Turing test is passed (i.e., when the human user passes the test), the threat response platform allows the connection. When the client computer fails the Turing test (i.e., when the malware is unable to pass the Turing test), the threat response platform blocks the connection.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE FIGURES

The novel features of the invention are set forth in the appended claims. However, for purpose of explanation, several embodiments of the invention are set forth in the following figures.

FIG. 5 illustrates an incident summary interface of some embodiments.

FIG. 8 illustrates an alternate response interface of some embodiments.

FIG. 9 illustrates the incident report interface after the threat response system has applied an automatic response to the malware incident.

DETAILED DESCRIPTION

Some embodiments provide a threat response platform that enables a user to determine whether suspicious activity is a result of malware, or is not the result of malware. The threat response platform of some embodiments is part of a threat response system that includes threat detectors, the threat response platform, and inline security measures (e.g., firewalls). The threat response platform of some embodiments receives initial reports of suspicious activity from threat detectors, gathers data with an active correlation system of the threat response platform, presents the data to a user, then allows a user to determine a response to the suspicious activity.

Figure 1:
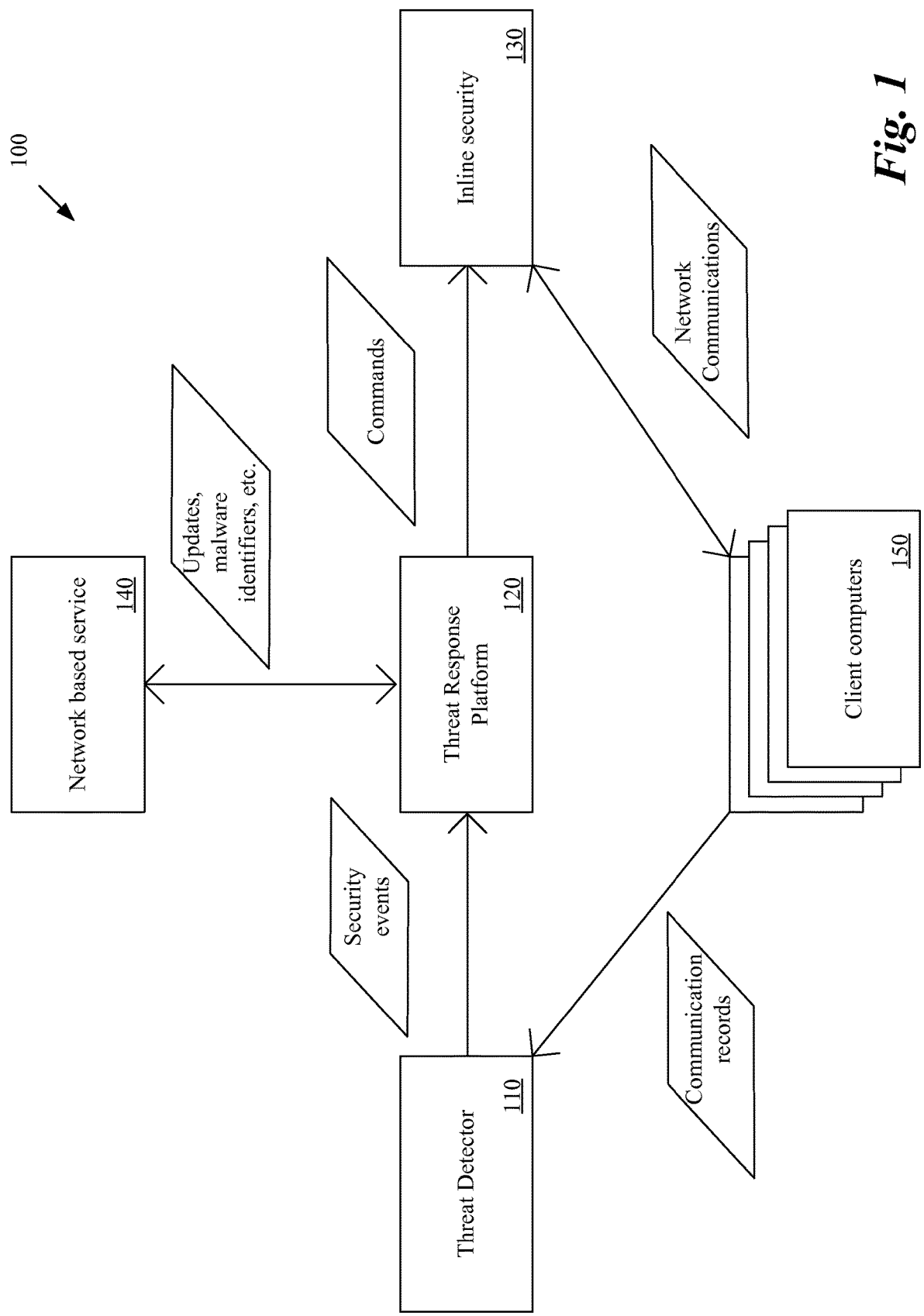
FIG. 1 conceptually illustrates a threat response system of some embodiments.

FIG. 1 conceptually illustrates a threat response system 100 of some embodiments. The figure includes a threat detector 110, a threat response platform 120, inline security 130, a network based service 140, and a set of client computers 150. The threat detector 110 monitors the communications between the client computers 150 and other computers (i.e., computers outside a corporate network of the client computers, other client computers, or other computers within the corporate network). The threat response platform 120 interprets data from the threat detector 110 and provides commands to the inline security 130. The threat response platform 120 of some embodiments also communicates with the network based service 140 to receive updates (e.g., updates of the threat response platform software), data used for identifying malware, and instructions. In some embodiments, the instructions define responses to particular types of malware. The network based service 140, in some embodiments, provides to the threat response platform, software updates, data that may be used for identifying malware, and instructions for multiple threat response platforms serving multiple customers.

The threat detector 110 monitors communications between the client computers 150 and other computers outside and/or inside the corporate network. In the illustrated embodiment, the threat detector 110 is operating in a non-inline mode so it is not in the data path (e.g., is not able to interfere in the flow of data) between the client computers and other computers (e.g., outside computers). However, in some embodiments, the threat response platform works with a threat detector operating in an inline mode. The threat detector 110 detects instances of the client computers accessing content that is determined to have malicious behaviors, but does not block communications between the client computers 150 and those locations. Rather, the threat detector 110 produces event reports identifying such suspicious communications as security events. The threat detector 110 then passes these event reports to the threat response platform 120.

In some embodiments, the threat response platform 120 receives reports of security events from the threat detector 110. The threat response platform 120 evaluates the event reports and gathers additional related data regarding the particular threat from other sources. The threat response platform 120 of some embodiments then determines whether the gathered data identifies a threat for which it has existing instructions. When the threat response platform 120 has existing instructions (e.g., instructions to command the inline security to block the client computers 150 from accessing a particular set of IP addresses), it applies the existing instructions. When the threat response platform 120 does not have existing instructions, it presents the automatically gathered data to a user in an incident report and allows the user to set a course of action for dealing with the incident. In some embodiments, the threat response platform 120 receives the user's instructions and sends them as commands to the inline security 130.

The inline security 130 is in the data path (e.g., is able to interfere with the flow of data) between the client computers and the other computers. The inline security 130 may include a firewall (or proxy) for blocking the client computers 150 from contacting specific location (e.g., specific IP addresses and/or specific hostnames). In some embodiments, the threat response platform 120 provides commands to configure the inline security 130 and the inline security 130 implements the commands. For example, the threat response platform 120 of some embodiments configures the inline security 130 with groups of IP addresses, hostnames, and other data. These groups can then be used in the security policies of the inline security 130, for example, to block connections between the client computers 150 and a suspicious IP address. In some embodiments, in addition to or instead of configuring the inline security with groups, the threat response program can configure the inline security with individual IP addresses, hostnames, and/or other data.

In addition to providing software updates to the threat response platform software 120, the network based service 140 of some embodiments supplies data for identifying malware to the threat response platform 120. In some embodiments, the data includes computer readable data for identifying actual indications of compromise that identify what type of changes are likely to occur on a computer that has been infected with hostile programs (i.e., "malware"). In some embodiments, the threat response platform 120 stores the data identifying actual indications of compromise in a local database to compare against data found on the client computers 150. Furthermore, the network based service 140 of some embodiments also provides instructions about how the threat response platform 130 should respond to a particular identified threat.

In some embodiments, in order to identify actual indications of compromise on a client computer, the threat response platform temporarily places an agent program on the client computer, which investigates the computer for potential indications of compromise (sometimes referred to as "potential IOCs"). As used herein, the terms "potential indications of compromise" or "potential IOCs" refer to what the agent collects (e.g., filenames of recently added or changed files, mutexes, recently changed or added registry keys, open connections, etc.) from the client device as possible signs of malware infection. The term "actual IOC" is used to indicate something that the threat response platform has identified (e.g., based on an IOC database) as being evidence of malware.

A "mutex" as used herein is an operating system object that can be accessed by multiple threads or processes running on a system. The operating system ensures that only one thread or process can "acquire" a mutex at any given time. A mutex is often used by software that wants to ensure only one copy of a program is running at time, even if the program is started multiple times. To avoid overloading a target computer, a malware program when it starts will typically try to acquire a mutex with a non-varying name to detect if the malware is already running. The fact that the name is non-varying, and that the mutex must exist the entire time the malware is running, makes it something that can uniquely identify the malware.

One of ordinary skill in the art will understand that the presence of an actual IOC on a client device does not necessarily mean that the client device is infected with the malware associated with that actual IOC. For example, in some cases, malware camouflages itself by naming its files with the same names as innocent program or system files. In some embodiments, finding a file with a filename shared by malware would be an actual IOC, but not definitive proof of malware, because the file could be a copy of the innocent program or system file. Other false positives among IOCs are possible. Accordingly, as described with respect to FIGS. 12-14C, below, the threat response platform of some embodiments uses multiple actual IOCs to determine a probability that a particular malware is present given the presence of multiple actual IOCs. Additionally, even if an actual IOC was caused by malware, it is possible that some other system (e.g., an anti-virus program) has removed the malware from the client device, but has not cleaned up all actual IOCs associated with that malware.

Section I, below, describes how the threat response platform of some embodiments identifies indications of compromise on client computers. Section II describes how the threat response platform of some embodiments sets up responses to actual indications of compromise. Section III describes graphical user interfaces of the threat response platform of some embodiments. Section IV describes some responses the threat response platform can take instead of commanding a firewall to entirely block access from a client to a location. Section V describes how the threat response platform of some embodiments re-evaluates previous reports in view of newly identified indications of compromise or a reweighting of previously identified indications of compromise. Section VI describes a computer system used to implement the threat response platform of some embodiments.

I. Identifying Indications of Compromise on Client Computers

The threat response platform of some embodiments places agent programs on client computers to find potential indications of compromise. The threat platform receives the potential indications of compromise from the agent and analyzes them to determine whether there are actual indications of compromise on the client computer.

Figure 2:
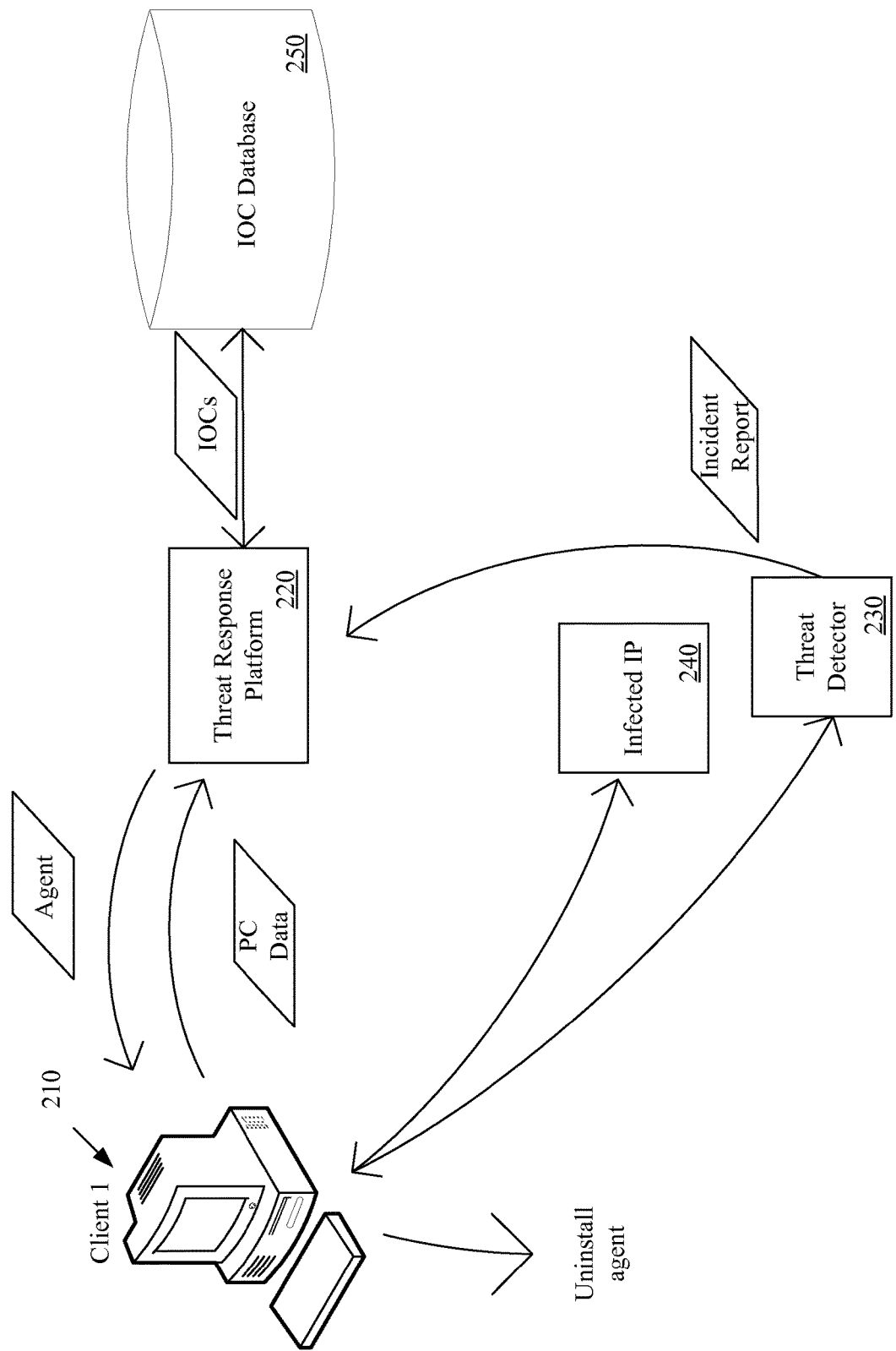
FIG. 2 conceptually illustrates procedures used by the threat response platforms of some embodiments for identifying potential indications of compromise on a client computer.

FIG. 2 conceptually illustrates procedures used by the threat response platforms of some embodiments for identifying potential indications of compromise on a client computer. The figure shows an exemplary environment of the threat response platform with a focus on the agent. Later figures (e.g., FIG. 4) provide a more detailed illustration of the environment and other capabilities of the threat response platform of some embodiments. FIG. 2 includes client computer 210, threat response platform 220, threat detector 230, malware related IP 240, and IOC database 250. The client computer 210 is a computer in an environment that includes a threat response platform 220 (e.g., a computer that is part of a network that includes a threat response platform on it). The threat response platform 220 is a system that includes software and, in some embodiments, hardware designed to act as an intermediary between the threat detector 230 and firewall software and/or hardware (not shown). The threat detector 230 is a program and/or hardware that detects attempts by malware to use the client computer 210 to connect to computers that are under the control of the hostile organization responsible for the malware (e.g., command and control servers or computers that are otherwise used by the hostile organization, such as computers owned by third parties that have also been compromised).

The "malware related IP" 240 is a location (e.g., an actual IP address or a hostname) that is known to either spread malware or control malware. The IOC database 250 contains data that identifies various indicators that may be used to determine whether a client computer 210 has been compromised by malware (e.g., actual IOCs). The data may include identifications of registry entries (e.g., keys) created by malware or altered by malware, identifications of files that contain malware or that are stored on a client computer by malware, mutexes, etc.

IOC databases of some embodiments contain IOCs provided by multiple sources (e.g., anti-malware programs, a central database of IOCs, identifications by users of the threat response platform based on potential IOCs found on a client device, etc.). In some embodiments, a threat detection platform or a network based service used by the threat response platform normalizes received IOCs from multiple sources into standard formats used by the threat response platforms.

In some embodiments, an active correlation system used by the threat response platform 220 begins when the client computer 210 attempts to contact a computer under the control of malware producers (e.g., malware related IP 240). A "malware related IP" could be a computer or other device that is itself infected by malware, a command and control server from which the malware producers send out commands to malware infected computers (e.g., computers in a "botnet"), a computer hosting one or more pieces of malware, or any other computer partially or completely under the control of the malware producers. When a connection from the client computer 210 is to a site known or suspected by the threat detector 230 to be under the control of malware producers, or when the threat detector 230 otherwise identifies a connection as suspicious, the threat detector generates an event report and sends the event report to the threat response platform.

In some cases, the threat detector 230 has no way of directly blocking suspicious connections since it is operating in a non-inline mode. Some threat detectors can optionally be set in an inline mode (able to block connections) or a non-inline mode (unable to block connections). A user (of the threat detector) may use the threat detector in a non-inline mode because (1) using the threat detector in an inline mode introduces another point of failure in the network should the hardware fail for some reason, and (2) it introduces extra latency in the network. The non-inline mode is designed to prevent the client computer from being cut off from legitimate connections due to false positives from the threat detectors, hardware failure of the machine on which the threat detector runs, etc. A false positive occurs when the threat detector identifies a harmless connection (or file, mutex, registry key, etc.) as suspicious. In order to distinguish between false positives and actual threats, the threat response platform 220 of some embodiments provides a user with various data related to the event report and the user makes a determination on whether the event report and/or other gathered data indicates malware or is a false positive. In some cases, a threat detector is able to operate only in an inline mode or able to operate only in a non-inline mode (i.e., the modes of such threat detectors are set, not optional).

When the threat response platform 220 receives the event report, the threat response platform 220 automatically, remotely places and activates an agent on the client computer 210. The agent is a program that searches the client computer for potential indications of compromise. The agent differs from a standard antivirus program in that the agent is temporary and remotely placed by the threat response platform. In some embodiments, the agent is placed only after the threat response platform 220 receives an event report from the threat detector 230. In particular, the threat response platform 220 of some embodiments places the agent on the client computer 210 and activates it in response to an identified possible threat (e.g., identified by the threat detector 230), rather than having the agent active on the client computer 210 at all times. However, in other embodiments, the threat response platform periodically (e.g., every day or every week) places an agent on the system to collect data in addition to or instead of placing the agent in response to events. In some embodiments, a user of the threat response platform can initiate the agent by an explicit command, either in addition to or instead of the automatic and/or periodic actions.

The agent, running on client computer 210, searches for potential IOCs on the client computer 210 and sends data identifying potential IOCs to the threat response platform 220. In some embodiments, the agent does not determine whether the collected potential IOCs are actual IOCs, but, rather, the agent collects the data (e.g., data identifying newly created or modified files, new registry keys, what mutexes are present on the client computer, etc.) and sends the collected data to the threat response platform 220 for evaluation. After sending the collected data of potential IOCs, the agent program of some embodiments uninstalls itself from the client computer 210. In some embodiments, the agent also differs from other malware scanners because the agent collects the information on the client device while the evaluation of the collected information is performed on a separate device (e.g., the device implementing the threat response platform 220). In contrast, other malware scanners download the evaluating software to the client computer. Such other malware scanner software on devices need to constantly be updated (e.g., to identify new threats). If such a malware scanner does not receive an update, then the computer on which it runs does not receive the latest protection. By performing the evaluation of the data separate from the client device, the threat response platform is able to ensure that the evaluation is performed using the most up to date analysis. Furthermore, the user of the client device is relieved of the duty of having to ensure that their malware scanners are up to date.

After receiving potential IOCs from the client computer 210, the threat response platform 220 interfaces with the IOC database 250 to compare the potential IOCs on the client computer 210 to the actual IOCs in the database 250. By comparing the potential IOCs to the actual IOCs in the database 250, the threat response platform 220 determines whether the potential IOCs found on the client computer 210 by the agent are strong evidence of an actual malware incursion on the client computer 210 (i.e., actual IOCs).

In some embodiments, the threat response platform 220 provides data to a user that allows the user to determine whether the event report (e.g., provided with the incident report) is a false positive or an actual indication of malware. The data includes identifiers of the actual indications of compromise and, if the actual indications of compromise identify (either definitively, or strongly enough to raise suspicions) a specific type of malware, then the data includes an identification of the type of malware.

Figure 3:
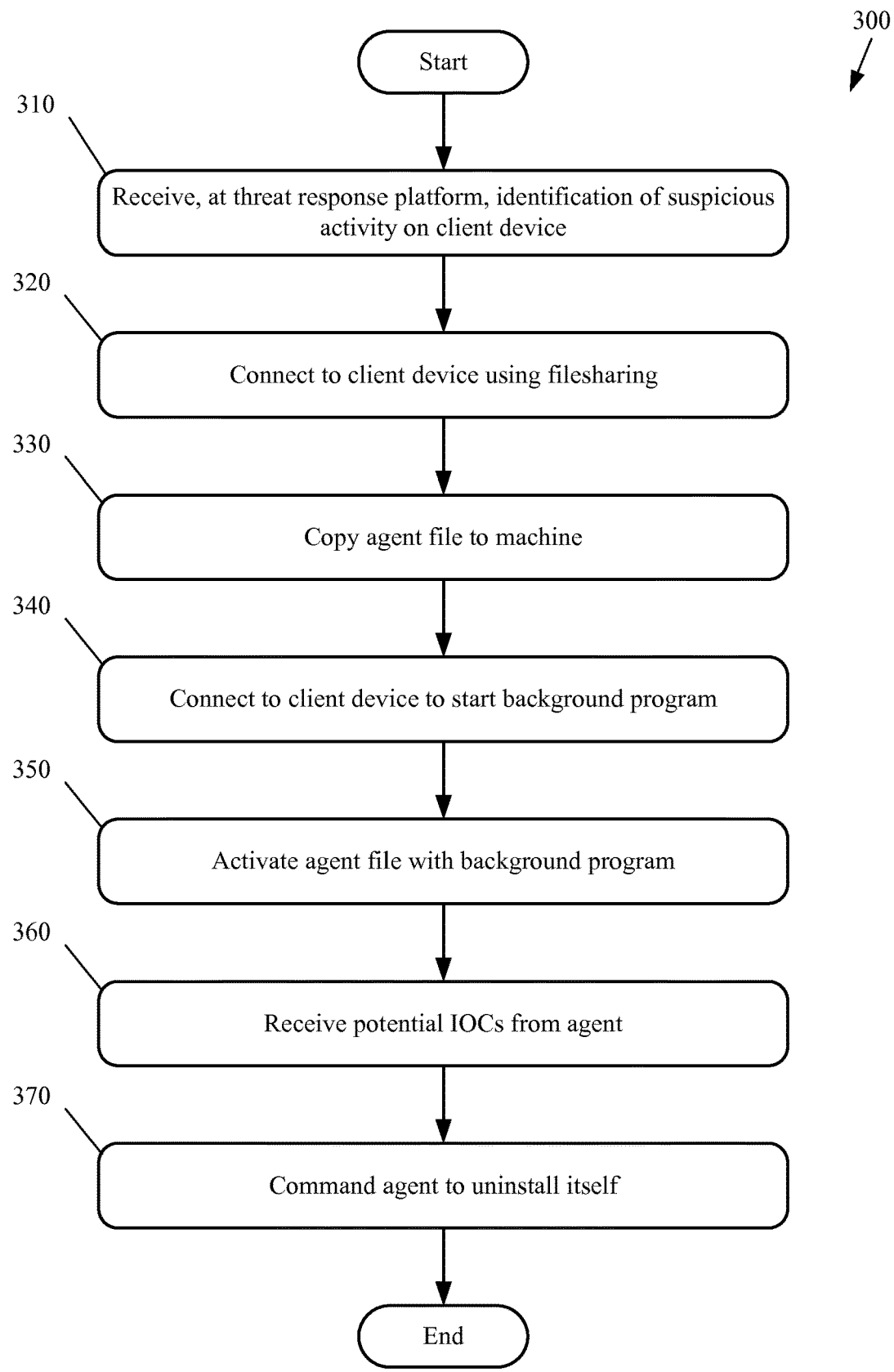
FIG. 3 conceptually illustrates a process of some embodiments for placing and activating an agent to scan a client device for potential indications of compromise.

FIG. 3 conceptually illustrates a process 300 of some embodiments for placing and activating an agent on a client device in response to an event report in order to scan the client device for potential indications of compromise. By placing and activating the agent on the client device, the threat response platform attempts to find further information for an incident report. Incident reports are further described with respect to FIG. 5, below. The process 300 receives (at 310), at a threat response platform, an event report that indicates suspicious activity on a client device (e.g., a report of suspicious activity on a virtual machine implemented on one or more client devices). In some embodiments, the event reports are received from a threat detector such as FireEye™, Palo Alto Networks threat detector, LastLine threat detector, or Ahn Labs threat detector. After receiving an event report, the process 300 connects (at 320) to the client device via a filesharing system (e.g., Windows filesharing). In some embodiments, in order to connect to the client device, the threat response platform uses domain admin credentials previously provided to it by a user. In some embodiments, the process 300 connects to the client device using other distribution methods (e.g., secure copy, server download, etc.).

After connecting with the client device, the process 300 copies (at 330) a file containing the agent program to the client device. The agent file contains instructions for determining potential indications of compromise on the client device. The agent file of some embodiments also contains additional instructions for downloading further data or programs to the client device and applying that data or those programs in order to search the client device for potential indications of compromise.

The process 300 once again connects (at 340) to the client device to start a background program (e.g., a service in Windows™). In some embodiments, when connecting to a Windows based client device, the process 300 uses DCE/RPC, a low level Microsoft® mechanism for doing remote procedure calls, to start the background program.

After connecting to the client device and starting the background program, the process 300 activates (at 350) the agent file using the background program. Once active (i.e., running on the client device), the agent program is able to run arbitrary code (i.e., whatever code the agent is programmed to run) on the client device in order to identify potential indications of compromise which the agent will then report to the threat response platform. The agent may also perform other tasks while running on the client device (e.g., the agent may update itself from online resources, etc.). Once the agent has gathered the potential indications of compromise, it sends them to the threat response platform. The process 300 receives (at 360) the potential indications of compromise from the agent. The process 300, in some embodiments, commands (at 370) the agent to uninstall itself. In some embodiments, the agent is programmed to uninstall itself (without a separate command from the threat response platform) after sending the potential IOCs to the threat response platform.

The process 300 ends after the uninstalling of the agent. The threat response platform of some embodiments then compares the potential IOCs gathered by the agent to known actual IOCs stored in an IOC database (e.g., IOC database 250 of FIG. 2). In some embodiments, the threat response platform may then present any actual IOCs (i.e., IOCs that have been identified by the threat response platform as evidence of malware), found in the potential IOCs, to the user. In some embodiments, the threat response platform is also able (e.g., at the user's request) to present the user with the potential IOCs gathered from the client computer.

II. Setting Up Responses to Actual Indications of Compromise

Figure 4:
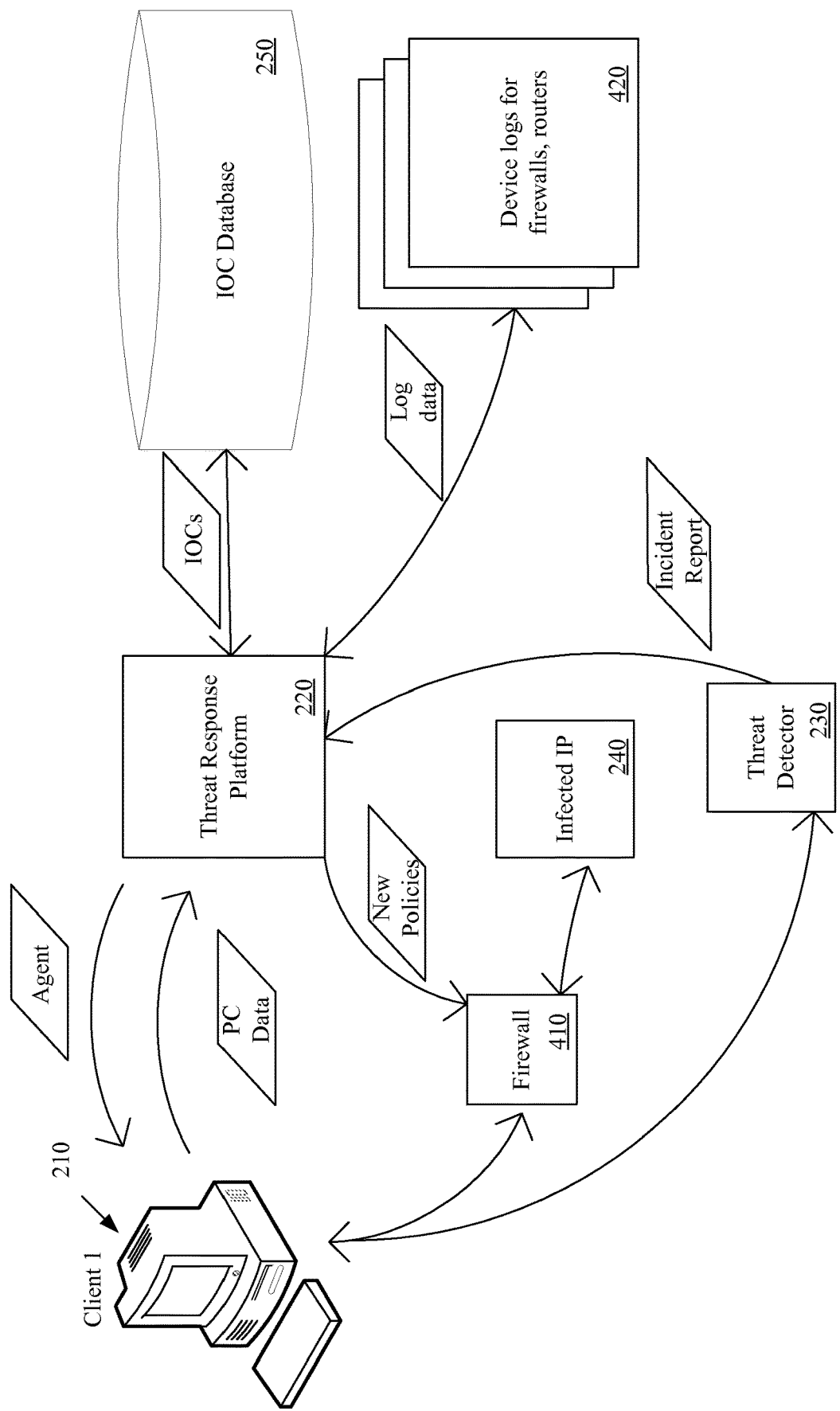
FIG. 4 illustrates a threat response system that automatically configures a firewall after a threat detector identifies a possible threat.

Once the actual indications of compromise, if any, have been presented to the user, some embodiments of the threat response platform allow the user to set an automatic response to the identified actual indications of compromise. FIG. 4 illustrates a threat response system that automatically configures a firewall after a threat detector identifies a possible threat. FIG. 4 illustrates more (e.g., more than FIG. 2) of the environment of the threat response platform of some embodiments and further functions of the platform in that environment. The figure includes (in addition to the threat response platform modules described in FIG. 2) a firewall 410 and device logs 420. The firewall 410 is a program that protects the client computer 210 by selectively blocking connections to specific sites and/or specific types of data. The firewall 410 could alternately run on the client computer 210 or on some other computer or device. The device logs 420 are a set of records of the connections from the client computer 210 and other client computers (not shown). The device logs 420 can be stored on the same computer as the firewall 410 or on some other computer(s) or device(s).

In some embodiments, after the threat response platform receives an event report, the active correlation system of the threat response platform 220 searches the device logs 420 for additional data related to the event report. For example, when an event report identifies a connection to a suspicious location (e.g., a known command and control server of malware or a known malware infection location), the threat response platform 220 searches the log data of the device logs 420 for other instances of attempted connections to that location and related locations. In some embodiments, the threat response platform 220 searches the device logs 420 only for data related to the client computer 210. In other embodiments, the threat response platform 220 searches the device logs 420 for data related to the client computer 210 and other client computers under the protection of the firewalls, routers, and other security programs of the threat response system. The threat response platform 220 of some embodiments presents the data to a user to help the user determine whether the event report is a false positive or identifies a genuine threat.

When commanded by a user, or in response to pre-programmed instructions, the threat response platform 220 of some embodiments provides new instructions to the firewall 410. In some embodiments, these new instructions are instructions to configure the firewall to block the client computer 210 from connecting to particular IP addresses or particular host names, instructions to block particular types of data, instructions to block particular types of data from particular locations (e.g., IP addresses or hostnames), instructions to block particular types of data from any location other than a particular set of locations (i.e., a whitelist), instructions to reroute connections through the threat response platform 220, instructions to synchronize IP lists or instructions to perform any other action of which the firewall 410 is capable.

III. Threat Response Platform Graphical User Interfaces

In some embodiments, the instructions from the threat response platform 220 are sent to the firewall 410 automatically as a result of the analysis of the data gathered by the active correlation system of the threat response platform 220 and/or at the directions of a user of the threat response platform 220. FIGS. 5-9 illustrate various user interfaces of threat response platforms of some embodiments. FIG. 5 illustrates an incident summary interface 500 of some embodiments. The incident summary interface 500 is an incident summary screen of some embodiments and the threat response platforms of other embodiments implement incident summary screens with additional features, fewer features, or different features than those of incident summary interface 500.

The incident summary interface 500 includes multiple selectable incident summary areas 510. Each incident summary area 510 includes a selectable incident title 512, a severity level indicator 514, an event-type 516, an event source 518, a description of responses 520, an identifier 522 of the most recent viewer of the incident (if any), an identifier 523 of the number of events matching the events in the incident report, and a close incident button 524.

In some embodiments, the threat response platform receives event reports from one or more threat detection programs (e.g., FireEye, etc.). The threat response platform of some embodiments provides a separate report for each incident reported by a threat detection program. In some embodiments, an incident report relates to a single event. In other embodiments, an incident report relates to one or more related events. The incident summary interface 500 allows a user to select among multiple incidents involving suspected malware and/or attempts to connect to known or suspected malware related locations. For each incident, the threat response platform generates an incident summary area 510. Each incident summary area 510 provides an overview of one particular incident. The overview in some embodiments includes the time of the incident, a title of the incident, the severity of the incident, an identifier of the source of the event report(s), etc. In some embodiments, a particular incident report includes events from one source (e.g., a single threat detector). In other embodiments, a particular incident report includes events from one or more sources (e.g., multiple threat detectors).

Figure 6:
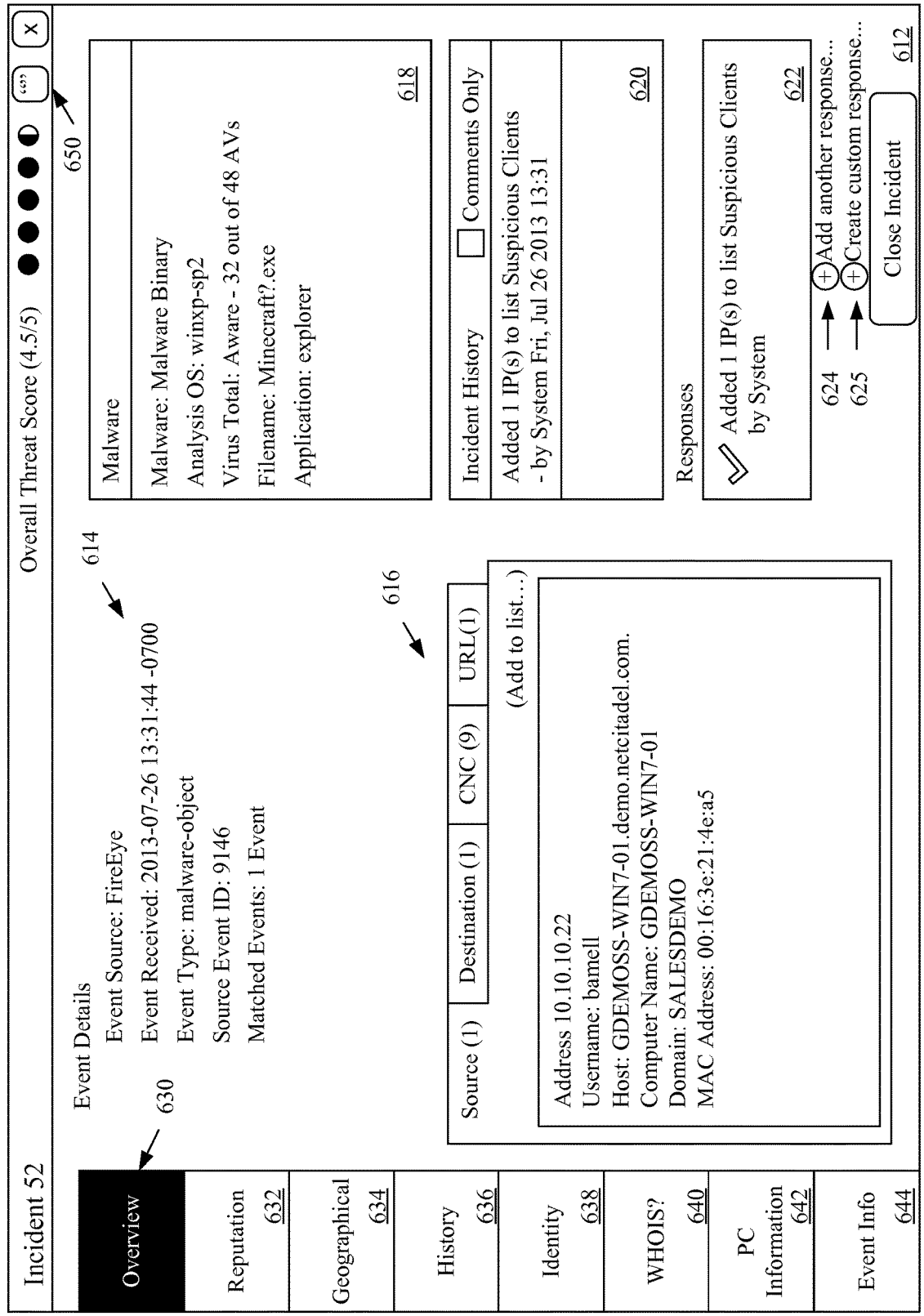
FIG. 6 illustrates an incident report interface of some embodiments.

The selectable incident title 512 provides a user with a unique name for each incident (e.g., "Incident 52"). In some embodiments, when a user selects a selectable incident title 512, the threat response platform provides a new interface with more detailed information about the particular incident. FIG. 6, below, illustrates a detailed incident report interface of some embodiments. A severity level indicator 514 provides an estimate of how dangerous a particular malware related incident is (e.g., how much damage the suspected malware is likely to do). In some embodiments, a larger number of bars on severity level indicator 514 indicates an increased severity level. Although the illustrated embodiment uses up to 5 bars to indicate severity, other embodiments use a higher (e.g., 7) or lower (e.g., 3) number of bars to indicate severity.

The event-type 516 indicates what type of event has been detected by the threat detector (e.g., malware object, port sniffing, etc.). An event source 518 identifies the name of the threat detection program(s) that provided the initial event report(s). A description of responses 520 indicates what actions have so far been taken about the malware by the threat response platform. In some embodiments, these responses may be automatic, done in response to user commands, or a combination of automatic responses and responses done in response to user commands. In some embodiments, the description of responses 520 discloses the number of responses performed, but does not provide any further details about the responses. An identifier 522 discloses the username of the most recent user of the threat response platform to view the more detailed incident report (see, e.g., FIG. 6). An identifier 523 discloses the number of matching events (e.g., in some embodiments, events match when the client computers try to contact the same suspicious IP address, etc.). The close incident button 524 is a control that a user selects to indicate that the incident is closed (e.g., after the incident has been evaluated and all necessary responses have been performed). As further described with respect to FIGS. 12-14C below, the threat response platform of some embodiments re-evaluates previously collected reports when the IOC database is updated (e.g., when a new set of actual IOCs is added to the database or when the present set of IOCs is re-weighted). In some embodiments, re-weighting an actual IOC in the IOC database means changing the effect of the actual IOC on a calculation that determines how likely a malware infection is, given the presence of a set of actual IOCs (e.g., a probability calculation). In some embodiments, even closed incident reports are reevaluated with respect to newly added or re-weighted actual IOCs in the IOC database. In some embodiments, the incident summary interface may have more or fewer identifiers and/or controls than are shown in FIG. 5.

As mentioned above, when a user selects an incident (e.g., by selecting an incident title) the threat response platform of some embodiments opens a more detailed incident report interface. FIG. 6 illustrates an incident report interface 600 of some embodiments. The incident response interface 600 provides a user with additional details about a specific incident, grouped into one interface, and controls for displaying still more details. The incident response interface 600 includes a set of detail controls 630-644. The detail controls 630-644 in FIG. 6 are set to show an overview 612 of the incident report. The overview 612 includes event detail area 614, a set of location tabs 616, a malware description area 618, an incident history area 620, a response area 622, and comment control 650.

The detail controls 630-644 provide access to various screen views of more detailed information within the incident report interface. When the detail controls 630-644 are set to show the overview 612, the incident report interface provides a brief description of multiple types of information. The event detail area 614 shows general information about the event that initiated the incident report. The general information in some embodiments includes the information previously shown in the incident summary area 510 of FIG. 5 and in some embodiments includes additional information such as the file name of the file responsible for the incident, the operating system of the client computer, etc. The location tabs 616 allow a user to select among various types of location information, such as the source of the suspicious connection (e.g., the IP address on the local network of the client computer responsible for the incident, the host, etc.), the destination of the suspicious connection, command and control (CNC) addresses associated with the incident, and the URL of the suspicious connection. In some embodiments, the tabs include the destination, CNC and URL tabs and the source information is displayed in a separate area.

The malware description area 618 displays data describing the identified or suspected malware (if any). For example, in some embodiments the malware description area includes the type of malware, the operating system under which the malware was identified, a virus Total™, a filename of the file containing the malware, and the application under which the malware runs.

The incident history area 620 displays various information about what the threat response platform has done and comments the users have provided regarding the incident. In some embodiments, the incident history area 620 lists both comments and responses. In some embodiments, the incident history area 620 includes a selectable control that (when activated) limits the incident history area to displaying comments only. The comment control 650 of some embodiments, when activated, opens a dialogue box in which a user can enter a comment to be shown in the incident report.

The response area 622 lists actions performed with regard to the incident (e.g., to which lists the IP address(es) associated with the incident have been added). In some embodiments, the lists to which IP addresses associated with incidents are added are lists kept by the threat response platform. The threat response platform of some embodiments has specific instructions for responding to certain items on the various lists (e.g., block all locations on a "malware callback sites" list; allow all connections on a "white" list, etc.). The response area 622 of some embodiments also provides a control 624 that opens a response interface to allow a user to designate a response to the incident and a control 625 that opens a custom response interface to allow a user to designate a custom response to the incident. A response interface of some embodiments is described with respect to FIG. 7, below.

As mentioned above, the detail controls 630-644 provide access to various screen views of more detailed information. In some embodiments, the threat response platform automatically gathers some or all of the more detailed information through an active correlation system that seeks out information relating to the incident. In FIG. 6 the overview control 630 is active and therefore the overview 612 is displayed. However, when the reputation control 632 is active, the incident report interface 600 displays information relating to the reputation of the IP addresses associated with the incident. The reputation information in some embodiments is obtained by querying a database about locations associated with the incident (e.g., the destination address of an attempted connection by a suspected piece of malware). In some embodiments, the threat response platform retrieves this reputation data from an external database that provides reputation information about IP addresses and/or hostnames (e.g., whether the site is a known malware related site).

When the geographical control 634 is active, the incident report interface 600 displays information identifying the geographical location of the suspicious IP address(es) or hostnames (e.g., in what country the computers associated with those IP addresses are located). The threat response platform of some embodiments automatically looks up the geographical location of the IP address as part of the active correlation system.

When the history control 636 is active, the incident report interface 600 displays information regarding the history of the incident. In some embodiments, this history is a more detailed or longer version of the information displayed in the incident history area 620 of the incident report interface 600. When the identity control 638 is active, the incident report interface 600 displays data related to the identity of the user of the client device on which the incident occurred at the time the incident occurred. In some embodiments, the identity data includes some or all of: a username, a display name, an email address, groups to which the user has access, the country of the user, the state of the user, and/or when the user last changed his or her password.

When the WHOIS control 640 is active, the incident report interface 600 displays information identifying the publicly available information regarding the listed owner of the suspicious IP address and/or hostname. The threat response platform of some embodiments automatically looks up the listed owner of the IP address(es) and/or hostnames as part of the active correlation system.

When the PC information control 642 is active, the incident report interface 600 displays information regarding the client PC (e.g., information relating to the malware and/or other information about the PC). In some embodiments, the PC information control 642 is called an "IOC data" control. The threat response platform of some embodiments automatically determines this information (e.g., IOC data and/or other information) from the PC as part of the active correlation system (e.g., from the agent program described with respect to FIGS. 2 and 4). When the event info control 644 is active, the incident report interface 600 displays further information regarding the reported event.

While the set of detail controls 630-644 is shown as including various specific controls, other embodiments may include more, fewer, or different controls. For example, in some embodiments, the controls include a control that allows a user to access data about an active directory of the network (e.g., a directory service implemented by Microsoft for Windows domain networks).

Figure 7:
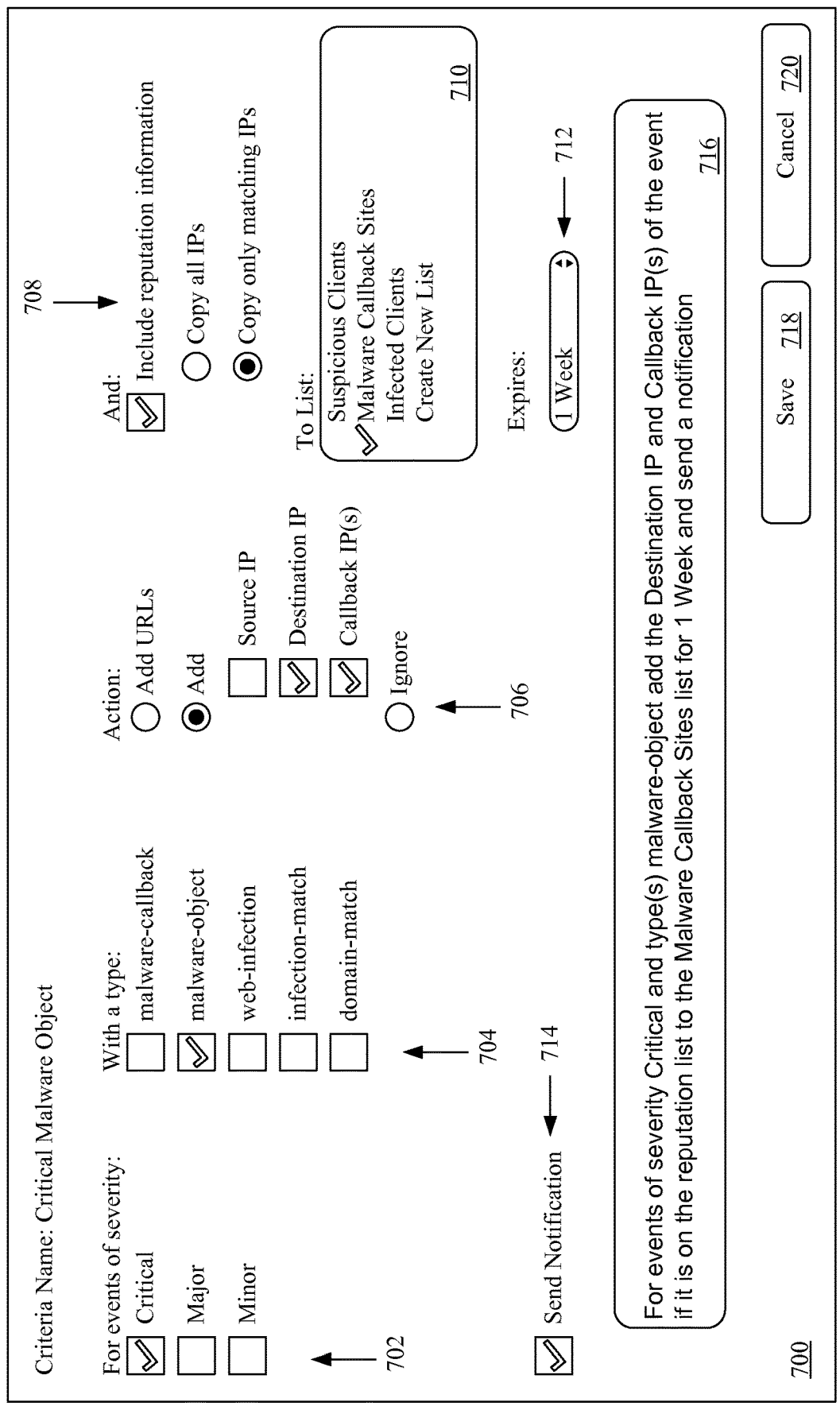
FIG. 7 illustrates a response interface of some embodiments.

The incident report interface 600 provides a large variety of data that may be useful in determining whether the incident report is indicative of malware or is a false positive. Once a user has determined whether the incident report is indicative of actual malware, the user can use the control 624, described above, to activate a response interface. FIG. 7 illustrates a response interface 700 of some embodiments. The response interface 700 allows a user to set up an automatic response to incident reports that fit certain parameters. The response interface 700 includes a severity setting 702, a type setting 704, an action setting 706, a reputation setting 708, a list setting 710, an expiration setting 712, a notification setting 714, a summary area 716, a save control 718, and a cancel control 720.

The severity setting 702 allows a user to set one or more severity parameters (e.g., critical, major, or minor). The type setting 704 allows a user to set one or more types of events. The action setting 706 allows a user to define an action (e.g., add the destination IP address(es) of malware to various lists, set up other systems to capture packets from the client device, collect packet captures from other systems, etc.). In some embodiments, the action setting allows the user of the threat response platform to set up an automatic response that revokes or restricts the access of a user of the client device to sensitive applications or groups (e.g., because the user's username and password may have been compromised). In some embodiments, the action setting allows the user of the threat response platform to set up an automatic response that performs a memory dump of the client device.

The reputation setting 708 allows a user to specify whether to add (to the lists) all identified IP addresses defined by the action setting 706, or only those IP addresses that are both defined by the action setting and have a known reputation. The list setting 710 allows a user to define a set of lists to add the designated URLs or IP addresses to. The expiration setting 712 defines the time period for which the designated URLs or IP addresses should be part of the list before being automatically removed from the list. The notification setting 714 determines whether to notify the user of the threat response platform when a new IP or URL is added to a list. When the parameters are set by settings 702-714, the summary area 716 displays a description of the rule represented by those parameters. The save control 718 allows a user to save a new automatic response and the cancel control 720 allows a user to exit the response interface 700 without saving a new automatic response.

Some of the settings (i.e., the severity setting 702, the type setting 704, some parameters determined by action setting 706, and the reputation setting 708) are filters that determine when the threat response platform should trigger an action. Some of the settings define what action to take (i.e., some of the parameters determined by action setting 706, the list setting 710, the expiration setting 712, and the notification setting 714). When the threat response platform receives an event report (in some embodiments, an event report and additional data such as actual IOCs collected by an agent and identified by the threat response platform) with parameters matching all the filters, the threat response platform takes the actions specified by the settings that define the actions to take. In some embodiments, the active correlation system gathers additional data that the threat response platform can use to determine whether an event identified in an incident report matches the parameters of an automated response. For example, the active correlation system gathers reputation data relating to suspicious IP addresses, and this reputation data is used to determine whether the event matches the reputation setting of the automated response.

Examples of other data that the system gathers in some embodiments are active directory lookup information, netbios information, user login information, and evidence of a compromise (as determined by matching potential IOCs against the actual IOCs in an IOC database). Collected data can be used to determine other data to collect, for example, the threat response platform of some embodiments queries another agent that is implemented on an active directory server. In some embodiments, the query is local to the threat response platform. In some such embodiments, an agent on the active directory server pushes updates to the threat response platform so the data in the updates can be queried locally. This query (e.g., a query to an agent on the active directory platform or a query of local data previously received from an agent on the active directory server) allows the threat response platform to map an IP address to a user name (the active directory agent keeps track of all logon/logoff events so that the active directory can identify what user is on any given IP address at any given time). After the IP address is matched to a user name, the threat response platform of some embodiments then does a further lookup on the user to figure out what active directory groups the user belongs to.

The effects of all the settings may be difficult for the user to understand. Accordingly, the description in summary area 716 indicates what the aggregate effect of the settings will be. In the illustrated example, summary area 716 indicates that, for events of critical severity, destination IP addresses and callback IP addresses with reputations will be added to the list of malware callback sites.

Figure 8:
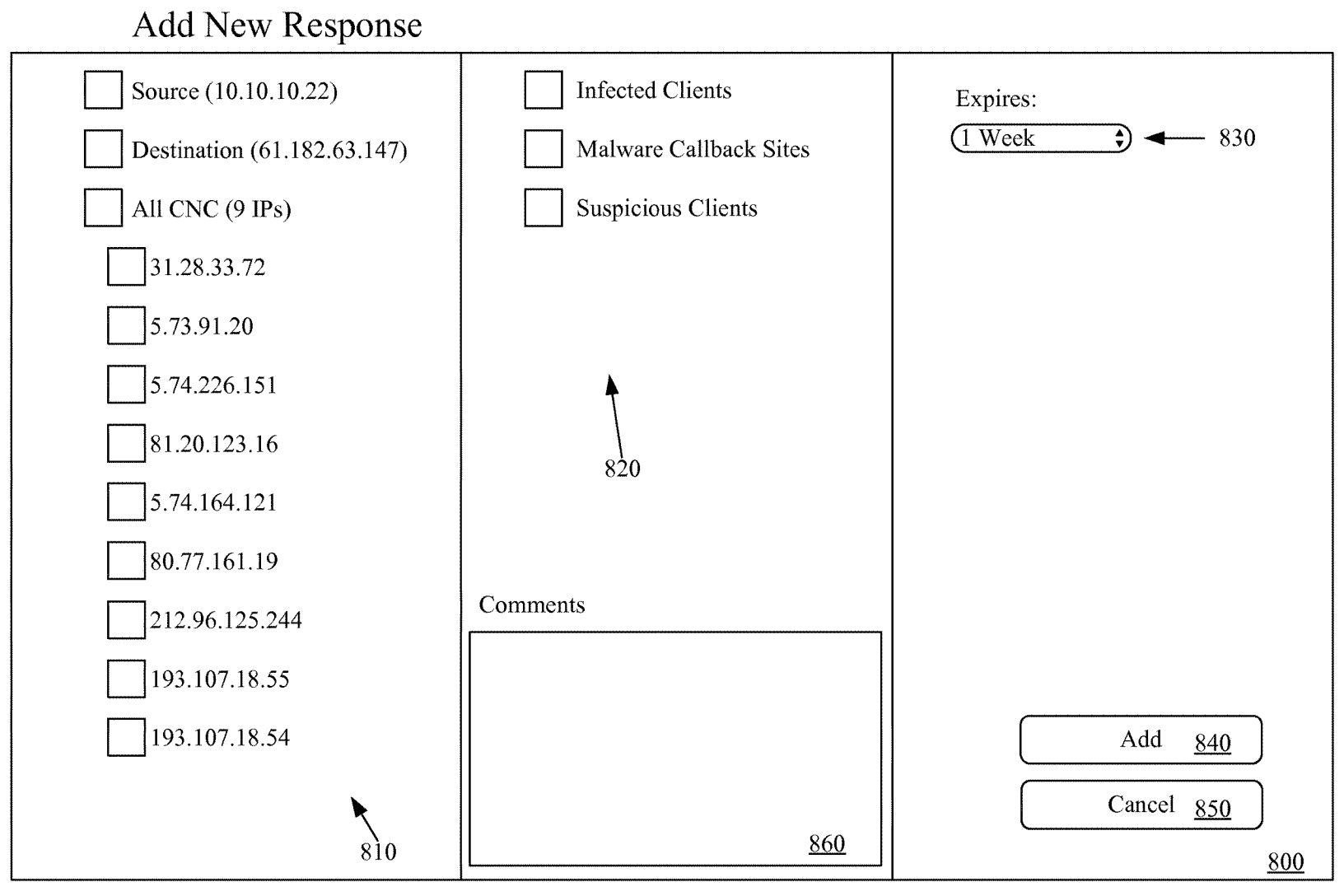

FIG. 8 illustrates an alternate response interface 800 of some embodiments. The alternate response interface 800 is streamlined compared to the response interface 700 of FIG. 7. FIG. 8 includes a location area 810, a list setting 820, an expiration setting 830, and add control 840, a cancel control 850, and a comments area 860. The location area 810 provides a list of locations relevant to an incident report. In some embodiments, the location area includes the source IP, the destination IP, and a list of command and control server IPs associated with the malware identified as the suspected cause of the incident. In some embodiments, the location area includes hostnames, or other types of location data. The location area 810 of some embodiments allows a user to select some or all of these locations to add to various lists. The threat response platform of some embodiments has specific instructions for responding to certain items on the various lists (e.g., block all locations on the "malware callback sites" list).

The list setting 820 allows a user to select which list or lists to add the selected items from the location area. In some embodiments, once the selected items have been added to a selected list, the threat response platform takes whatever actions are prescribed for items on that list (e.g., commanding a firewall to block connections to IP addresses on the list). The expiration setting 830 allows a user to determine how long to keep a location on a list before removing the item from the list. The add control 840 allows a user to add the new response with the selected location(s) and list(s) to a set of responses to an incident report. In some embodiments, adding the new response causes the threat response platform to implement the selected actions (e.g., adding the selected location to a list until the expiration time has passed). The cancel control 850 allows a user to exit the new response interface without adding a new response. The comments area 860 of some embodiments allows a user to make and/or see comments relating to the new response.

FIG. 9 illustrates the incident report interface 600 after the threat response system has applied the automatic response of FIG. 7 to the malware incident. The figure includes response 910, incident history entry 920. Response 910 indicates that 9 IP address have been added to the list of malware callback sites. In some embodiments, the active correlation system identifies additional IP addresses as being associated with malware identified on the system. In the illustrated example, the 9 IP addresses blocked include one IP address provided by the threat detector as part of the event report and 8 additional IP addresses identified by the threat response platform as relating to the malware that caused the incident report. However, in other embodiments, the threat detector, rather than the threat response platform, identifies the additional IP addresses. The response 910 is consistent with the rule shown in the summary area 716 in FIG. 7. Similarly, the incident history entry 920 shows that the incident was identified as malware.

As mentioned above with respect to FIG. 4, the threat response platform of some embodiments sends commands to a firewall to block the client computers from connecting to certain locations (e.g., websites, IP addresses, hostnames, locations used by various applications, etc.). In some embodiments, the threat response platform automatically adds IP addresses on one or more lists of IP addresses to the firewall's blocked list. Accordingly, when an IP address is added to such a list by an automatic response, the threat response platform also automatically commands the firewall to add the IP address to the firewall's blocked list.

IV. Alternative Responses

Figure 10:
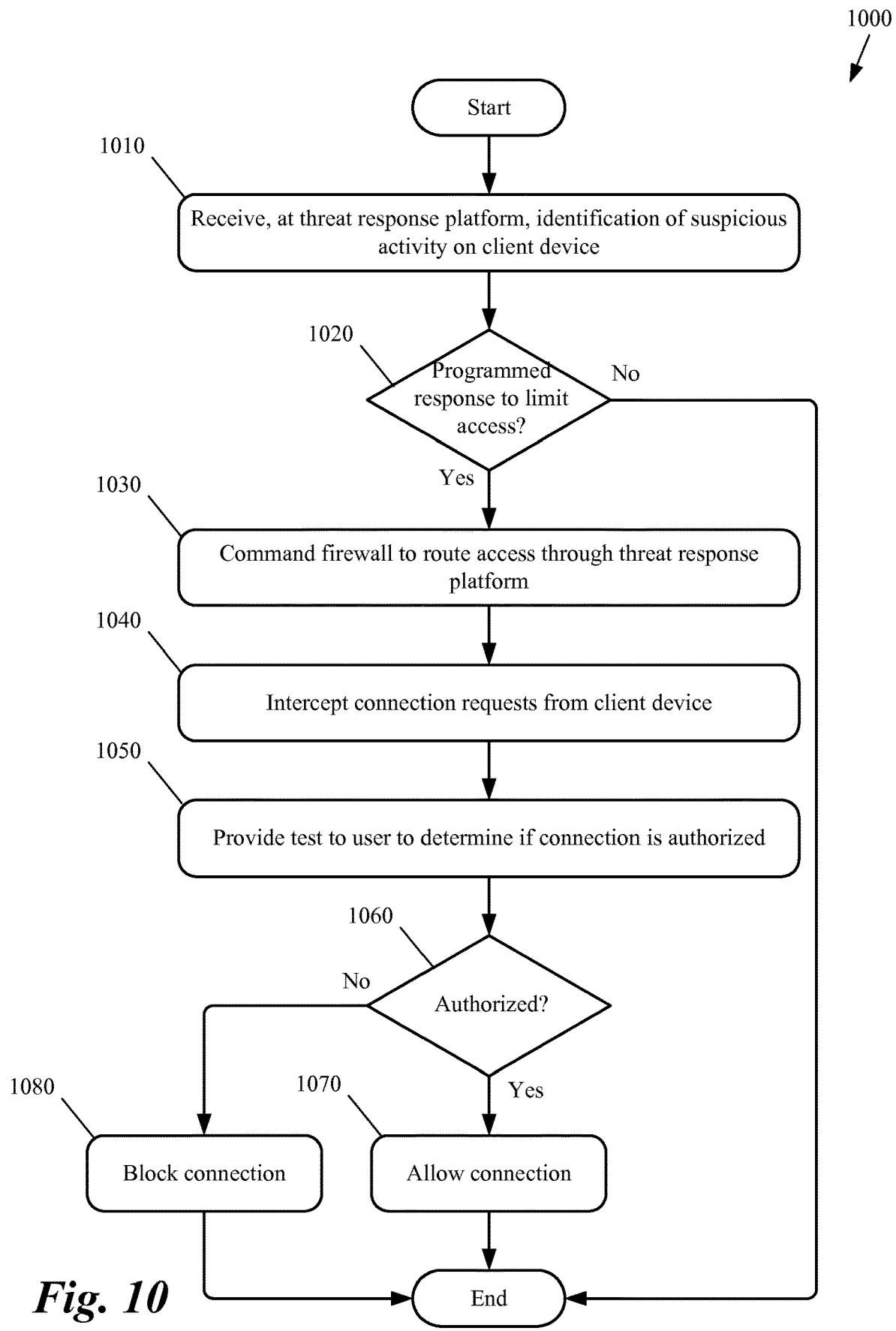
FIG. 10 conceptually illustrates a process of some embodiments for selectively blocking a location.

In addition to commanding the firewall to completely block an IP address, hostname, or URL, the threat response platform of some embodiments can provide alternative responses. For example, the threat response platforms of some embodiments work in conjunction with a firewall to selectively block an IP address, hostname, or URL. FIG. 10 conceptually illustrates a process 1000 of some embodiments for selectively blocking a location. The process 1000 receives (at 1010) at the threat response platform, an event report. The process 1000 determines (at 1020) whether an automatic response to the event report (and/or data gathered in response to the event report) requires that access to a location (e.g., to an IP address of the event report) should be limited, but not blocked. When there is no programmed response to limit access, the process 1000 ends (after which, for example, other processes start which block access entirely, allow access entirely, or follow any of a broad range of firewall policies that are not directly tied to the threat response platform).

When there is a programmed response to limit access without blocking access (e.g., to an IP address) entirely, the process 1000 commands (at 1030) the firewall to route access to the location(s) in an incident report (e.g., an incident report generated in response to the event report) through the threat response platform. In some embodiments, when the firewall cannot selectively route connections to particular locations through the threat response platform, the firewall routes all non-blocked connections through the threat response platform and the threat response platform determines which connections to allow. By routing the connections through the threat response platform, the firewall allows the threat response platform to determine whether a given connection will be allowed or blocked. The process 1000 then intercepts (at 1040) the connection requests to the specified locations from the client device(s).

The process 1000 then provides (at 1050) a test to the user of the client device to determine whether the suspicious connection that was routed through the threat response platform is authorized by a human being. In some embodiments, the test is only provided when the user attempts to make a connection to a web site. In other embodiments, the test is provided for other types of connections in addition to or instead of being provided for web site connections. The test includes a Turing test in some embodiments. A Turing test is a test which is easy for a human to correctly respond to, but difficult for an automated system (e.g., malware) to respond to. In some embodiments, the test is given repeatedly until either the user passes the test, cancels the attempt to connect to the limited location, or a certain threshold number of attempts to pass the test have failed. When the process 1000 determines (at 1060) that the connection is authorized, the process allows (at 1070) the connection. When the process 1000 determines (at 1060) that the connection is not authorized, the process blocks (at 1080) the connection. After allowing or denying the connection, the process 1000 ends.

In some embodiments, the threat response platform applies a test for authorizing a connection when a client computer attempts to access certain types of data at a particular location, but allows the connection without a test when the client computer attempts to access other types of data at the particular location. For example, the threat response platform of some embodiments applies a test when the client computer attempts to access a Java application (or a Flash application) from a particular IP address, but allows a connection to that IP address without a test when the client computer attempts to access text data.

Figure 11:
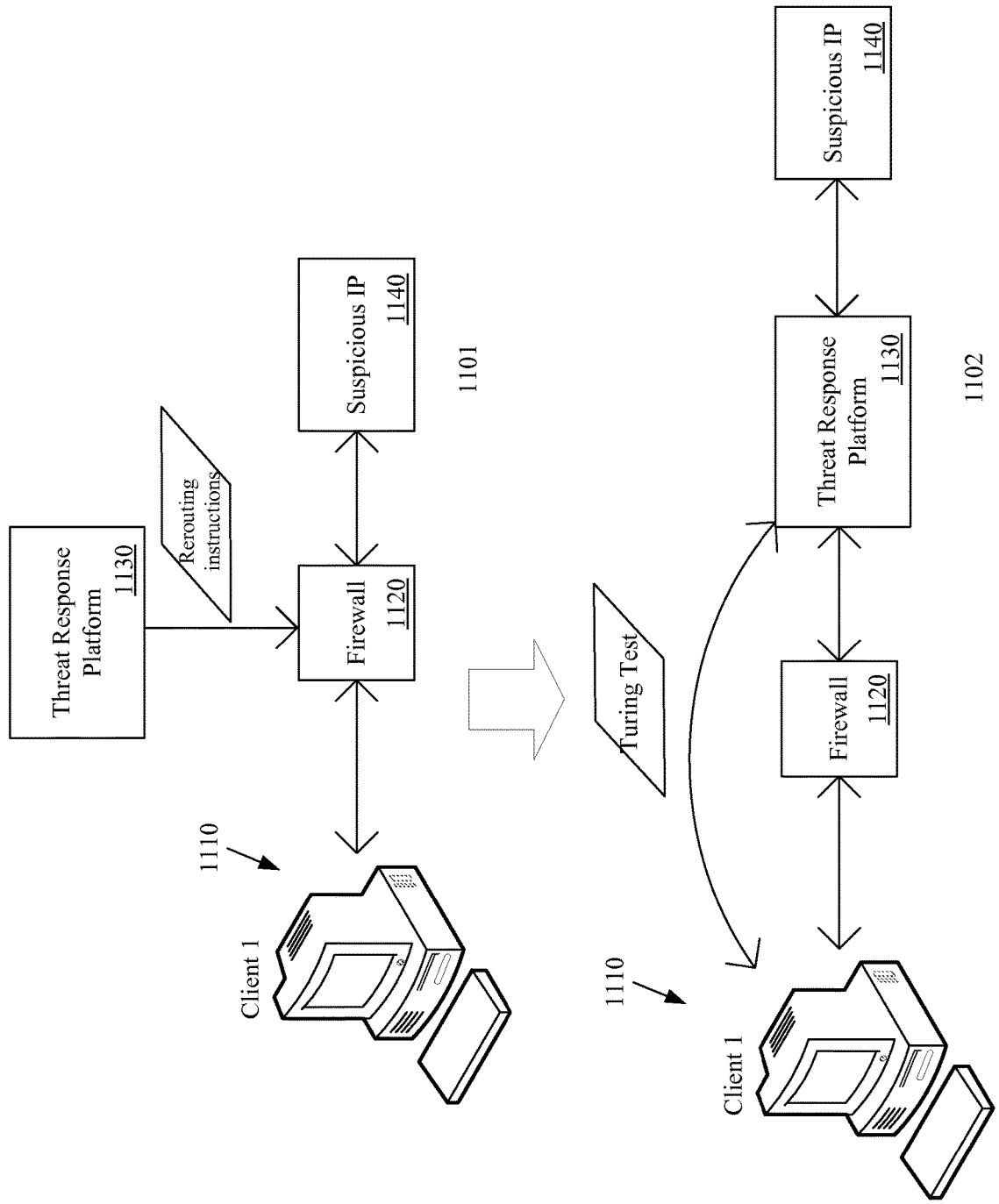
FIG. 11 illustrates a threat response platform that tests for authorization in some embodiments.

FIG. 11 illustrates a threat response platform that tests for authorization in some embodiments. The figure includes client computer 1110, firewall 1120, threat response platform 1130, and suspicious IP 1140. The figure is shown in two stages 1101 and 1102. Stage 1101 shows a firewall 1120 protecting a client computer 1110, before a threat response platform 1130 re-routes the connections between the firewall and the suspicious IP 1140. In particular, the threat response platform 1130 commands the firewall 1120 to re-route connections to the suspicious IP 1140 through the threat response platform 1130. Stage 1102 shows the firewall 1120 and threat response platform 1130 protecting a client computer 1110, after a threat response platform 1130 commands the firewall 1120 to re-route connections to the suspicious IP 1140 through the threat response platform 1130.

In stage 1101, the firewall 1120 determines whether to allow the client computer 1110 to access suspicious IP 1140. In some embodiments, the threat response platform determines to re-route the connection between the client computer 1110 and the suspicious IP 1140 in this stage. Accordingly, in stage 1101, the threat response platform 1130 sends rerouting instructions to firewall 1120.

In stage 1102, the firewall 1120 routes connection requests to the suspicious IP 1140 through the threat response platform 1130. Also, in stage 1102, the threat response platform 1130 communicates with the client computer 1110, providing the client computer with a Turing test to determine whether a human is authorizing a connection to suspicious IP 1140.

As described above with respect to FIG. 10, when the user of client computer 1110 passes the Turing test, the threat response platform 1130 allows the connection to the suspicious IP 1140. However, when the client computer 1110 fails the Turing test, the threat response platform 1130 blocks the connection to the suspicious IP 1140.

FIGS. 10 and 11 illustrate embodiments in which the threat response platform re-routes communications and requires a user to pass a Turing test before allowing access. However, the threat response platforms of some embodiments provide a wide range of options for non-blocking actions in addition to or instead of re-routing and supplying a Turing test. For example, the threat response platform of some embodiments triggers a PC memory capture, starts a packet capture (e.g., of packets going to and/or from a client device suspected of being infected with malware), and moving a user to a different Active Directory group. Which option, or options the threat response platform uses in response to various scenarios (e.g., particular sets of actual IOCs being discovered, etc.) is determined by the configuration of the threat response platform in some embodiments.

V. Re-Evaluating Previous Reports

As described above, an agent is placed on a client device to collect data identifying potential IOCs on the device. The results of collecting this data and comparing it against various actual IOCs in the IOC database are presented to a user of the threat response platform. If the user decides that there's enough evidence that malware is present, the user can indicate that to the threat response platform. The user of the threat response platform can command the threat response platform to take some kind of corrective action (e.g. submit a helpdesk request to reimage the machine, or block network access for the user of that client device). That indication from the user of the threat response platform can also be used in a machine learning system as training data for the threat response platform. The identification of malware, along with the identified actual IOCs can also be used just as a point of comparison for how similar another potential-to-actual-IOCs analysis turns out to be.

Figure 12:
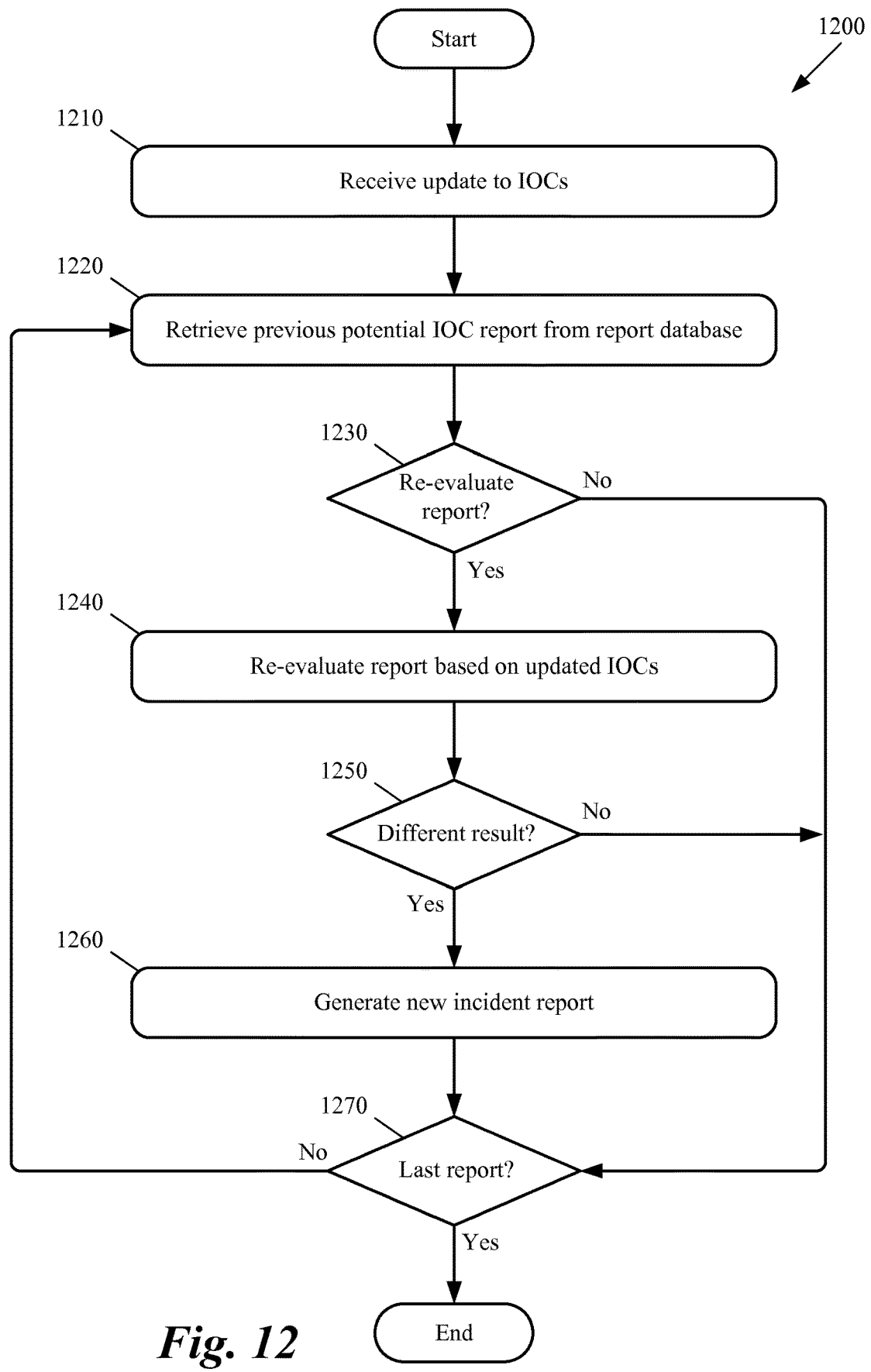
FIG. 12 conceptually illustrates a process of some embodiments for re-evaluating previously collected sets of potential IOCs.

The threat response platform of some embodiments re-evaluates previously collected potential IOCs under some circumstances. FIG. 12 conceptually illustrates a process 1200 of some embodiments for re-evaluating previously collected sets of potential IOCs. The process 1200 receives (at 1210) an update to the IOCs. For example, the threat response platform of some embodiments re-evaluates when a new set of actual IOCs are added to the database (e.g., when a new malware or a new version of an old malware is discovered), when a set of IOCs are modified (e.g., when a malware is discovered to have more IOCs than previously realized), and/or when the known actual IOCs are re-weighted (e.g., when a value related to the actual IOCs that is used to calculate a likelihood of malware is changed in such a way that the determined likelihood of malware increases based on that IOC, alone and/or in combination with other actual IOCs).

The process 1200 retrieves (at 1220) a previous potential IOC report from a report database. For example, the IOC report database may contain previously evaluated incident reports (with some or all of the evidence, including the potential IOCs gathered from a client device by an agent). In some embodiments, the process 1200 retrieves the entire incident report containing the IOC report. In other embodiments, the process 1200 retrieves the IOC report, but not other parts of the incident report. The report database of some embodiments includes closed incidents as well as or instead of open incidents.

The process 1200 determines (at 1230) whether to re-evaluate the report. The threat response platform of some embodiments determines not to re-evaluate some IOCs under various circumstances in various embodiments. For example, the threat response platform of some embodiments limits the re-evaluation to some pre-set time limit (e.g., potential IOCs collected within the previous seven days, 30 days, etc.). In some embodiments, the threat response platform does not re-evaluate reports from client devices that have been removed from the system or re-imaged since the report was generated. In some embodiments, the threat response platform does not re-evaluate reports that have been previously evaluated by a user. In some embodiments, the process determines not to re-evaluate reports that are already classified as indicating malware, etc. When the process 1200 determines (at 1230) not to re-evaluate the report, the process 1200 proceeds to operation 1270, described below.

When the process 1200 determines (at 1230) to re-evaluate the report, the process re-evaluates (at 1240) the report based on the updated IOCs. As mentioned above, the update may include the addition of new actual IOCs to the IOC database and/or a re-weighting of the previously entered actual IOCs in the database.

The process 1200 then determines (at 1250) whether the re-evaluation produced a different result. For example, if a report previously classified as not indicating malware is re-evaluated as indicating malware, then that is a different result. In some embodiments, a sufficiently changed probability of malware is considered a different result. For example, if the previously identified actual IOCs in a report indicated a 20% chance of malware and under the re-evaluation the actual IOCs (because of re-weighting or because additional actual IOCs have been found) indicates a 70% chance of malware, that is a different result in some embodiments.

When the result is not different (at 1250), the process 1200 proceeds to operation 1270, described below. When the result is different (at 1250), the process 1200 generates (at 1260) a new incident report. In some embodiments, the process re-opens and updates an existing closed incident report or highlights the new result in some other way (e.g., identifying the updated existing report as having a changed result).

The process 1200 then determines (at 1270) whether the report was the last report in the database to be checked for re-evaluation. When the report is determined (at 1270) to be the last report, the process 1200 ends. When the report is determined (at 1270) to not be the last report, the process 1200 returns to operation 1220 and retrieves the next potential IOC report (in some embodiments, the process 1200 retrieves the entire incident report containing the IOC report) from the database.

In some embodiments, when the threat response platform receives an incident report with a set of potential IOCs that include some actual IOCs, but not all actual IOCs, associated with a particular item of malware, the threat response platform determines whether that combination of actual IOCs has been found in a previous incident report. If that set of actual IOCs has been found in a previous incident report, the threat response platform follows the instructions of the user with respect to the previous report (e.g., classifying the new incident report as caused by malware, or not caused by malware, depending on the user's classification of the previous incident report).

A complete match to a previously identified incident of malware infection would be a strong indication of malware infection on the second client device. The user could configure the threat response platform to automatically treat data collections that have these same matches as indicating malware and execute some set of responses. The user could configure the system either when the first incident report was received, or at any other time (e.g., when the second matching incident report was received).

Similarly, a complete match to an incident identified by the user as not caused by malware would be a strong indication that the new incident was not caused by malware. One issue with requiring a complete match would be that if there is a slight difference in the sets of actual IOCs, then the threat response platform or the user must determine whether that is also an indication of malware infection. In some embodiments, the threat response platform has a threshold for how close two reports have to be (e.g., 80% the same) before automatically identifying the later report as malware (given that the previous report was identified as malware). In other embodiments, the threat response platform takes each individual match from the actual IOCs (e.g., when a particular registry key of the potential IOCs matches an actual IOC in the database, etc.) and tries to correlate that match to how likely it is that there is malware (from cases where the user tells the threat response platform when there really is an infection). This could also be done by the threat response platform taking pairs of matches (e.g. this registry key and that file) and trying to correlate those to a likelihood of malware. The larger the set (3-4 things instead of just 1) that can be found that is highly correlated with malware, the more confidence the threat response platform will have when identifying future matches of that set as indicating malware.

Accordingly, when the threat response platform does not identify that the same subset of actual IOC matches is present in a new report as in a previously classified report, the threat response platform determines whether a strong correlation exists between previously identified sets of actual IOCs. In some embodiments, the threat response platform performs an automatic response when a strong correlation is found between a set of newly collected actual IOCs and a set of actual IOCs previously classified as indicating malware, but presents the newly collected set of actual IOCs to the user (e.g., in a new incident report) if the correlation is between a set of newly collected actual IOCs and a set of actual IOCs previously classified as not indicating malware. In some embodiments, the threat response platform performs an automatic response when a strong correlation is found between a set of newly collected actual IOCs and a set of actual IOCs previously classified as indicating malware, and presents the newly collected set of actual IOCs to the user (e.g., in a new incident report) if the set of newly collected actual IOCs includes all actual IOCs of the set previously classified as not indicating malware, plus additional actual IOCs indicating the same malware that was originally suspected. Presenting strong correlations to the user in such embodiments allows the user to evaluate cases when all the previously found actual IOCs are present, plus additional actual IOCs indicating the same malware.

Figure 13:
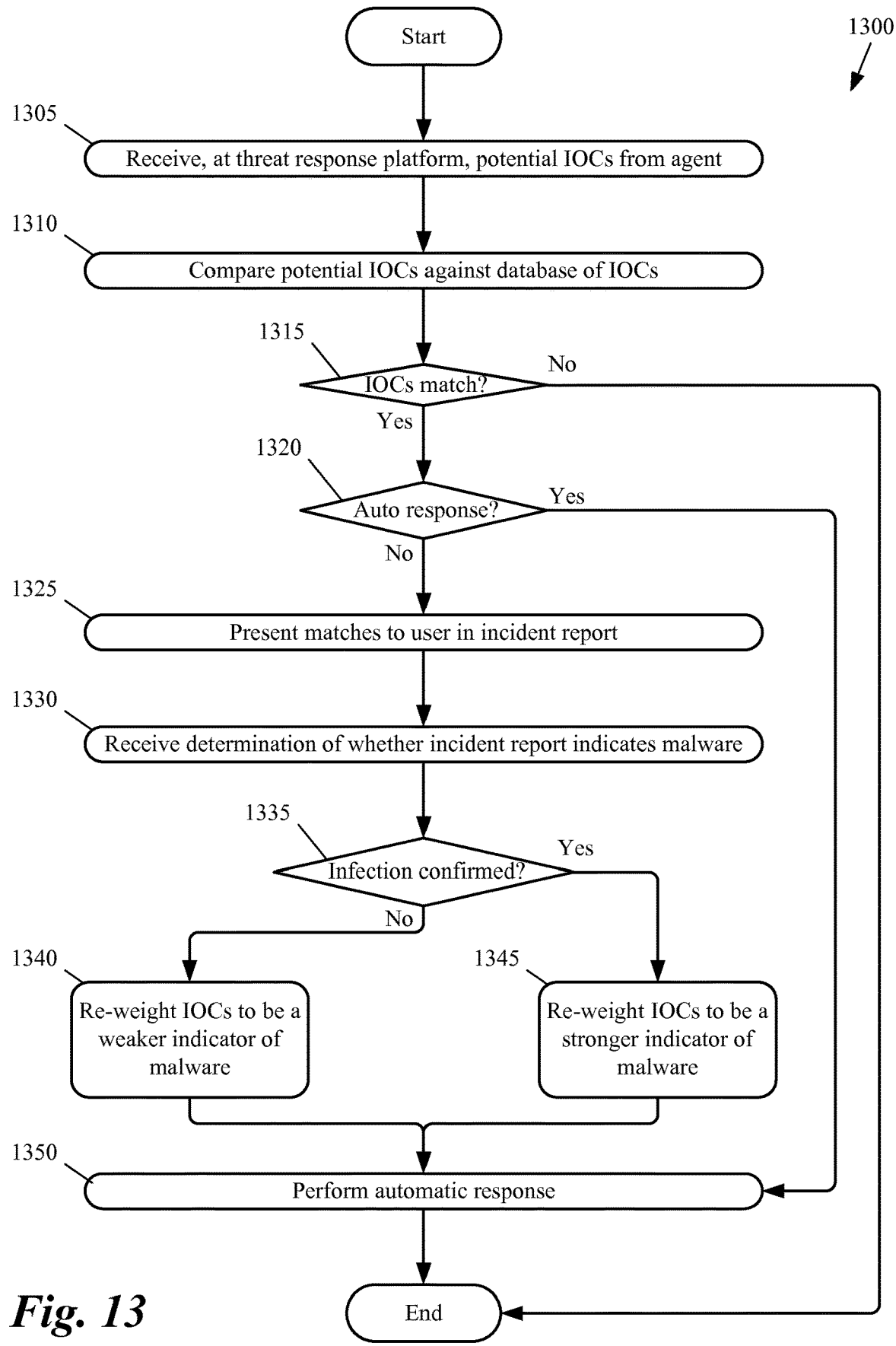
FIG. 13 conceptually illustrates a process of some embodiments for reweighting actual IOCs.

The threat response platform of some embodiments reweights actual IOCs in response to user identifications of sets of actual IOCs as indicating malware or not indicating malware. FIG. 13 conceptually illustrates a process 1300 of some embodiments for reweighting actual IOCs. The process 1300 receives (at 1305) a set of potential IOCs from an agent on a client device. As described above, the set of potential IOCs in some embodiments includes identifiers of newly modified files and registry keys, identifiers of mutexes on the client device and identifiers of open connections from the client device to other locations. The process 1300 then compares (at 1310) the potential IOCs against the actual IOCs in the IOC database. The process 1300 determines (at 1315) whether there are matches between the potential IOCs from the client device and the actual IOCs in the database. When there are multiple matches (e.g. a few registry keys, a few files, and a mutex), that is strong evidence of compromise (e.g., malware infection).

When the process 1300 determines (at 1315) that there are no matches, the process 1300 ends. When the process 1300 determines (at 1315) that there are matches, the process 1300 determines (at 1320) whether the threat response platform has an automatic response for the particular set of actual IOCs. When the platform has an automatic response, the process performs (at 1350) the automatic response and then ends. When the threat response platform does not have an automatic response (e.g., the first time a particular set of actual IOCs has been found by the threat response platform), the process 1300 presents (at 1325) the matches to the user in an incident report. In some embodiments, the incident report contains additional information besides the actual IOCs (the potential IOCs found by the agent that match actual IOCs in the database). In some cases, the identified actual IOCs might be a subset of the full set of actual IOCs of a particular type of malware.

The process 1300 receives (at 1330) from a user, a determination of whether the incident report (including the set of actual IOCs) indicates malware or does not indicate malware. The process 1300 then determines (at 1335) whether the user has confirmed an infection. When the process determines (at 1335) that the user has confirmed that the actual IOCs do not indicate an infection, the process 1300 re-weights (at 1340) the actual IOCs in the set of matching actual IOCs to be a weaker indicator of malware. Re-weighting the actual IOCs changes the amount that the threat response platform relies on those particular actual IOCs in determining whether a particular item of malware is (or was) present on the client device. Re-weighting the actual IOCs to make them a weaker indicator reduces a probability (calculated by the threat response platform) that the malware is (or was) present given that the actual IOCs are present. The process 1300 then ends.

When the process determines (at 1335) that the user has confirmed an infection, the process 1300 reweights (at 1345) the actual IOCs in the set of matching actual IOCs to be a stronger indication of malware. The process 1300 then performs (at 1350) automatic actions (e.g., automatic actions set by the user) and then ends. Re-weighting the actual IOCs to make them a stronger indicator increases a probability (calculated by the threat response platform) that the malware is (or was) present given that the actual IOCs are present.

In some embodiments, when the threat response platform calculates that the probability of malware is above a threshold probability (e.g., above 50%, 60%, etc.), the automatic actions include prioritizing a report of the incident so that the user sees that report before seeing other reports, sees a link to the report emphasized, or otherwise emphasizing the report over less urgent reports (e.g., reports with a lower probability of malware, less dangerous suspected malware, etc.). In some embodiments when the threat response platform calculates that the probability of malware is above a threshold probability, the threat response platform may take stronger actions automatically (e.g., commanding a firewall to block a connection) instead of or in addition to emphasizing the incident report. In some embodiments, the threshold probability for taking such stronger actions is higher than the threshold probability for emphasizing a report. In other embodiments, the threshold probability for emphasizing a report is the same or higher than the threshold probability for taking stronger actions.

In some embodiments, when the process 1300 ends after increasing and/or decreasing the weights of one or more actual IOCs, the threat response platform re-evaluates previous incident reports to determine if the previous incident reports should be reclassified under the new weighting of the actual IOCs. For example, if the actual IOCs have been reweighted to be a stronger indication of malware, the threat response platform would re-evaluate incident reports that contain those actual IOCs and that were previously classified as not being caused by malware. In some cases, the new weights of the actual IOCs will change the outcome of the analysis of the previous report. In some embodiments, when an evaluation of a report is changed, the new result is presented to a user for verification. In other embodiments, the threat response platform automatically performs the actions (e.g., commanding a firewall to block connections, etc.) prescribed for dealing with that particular malware.

Figure 14A:
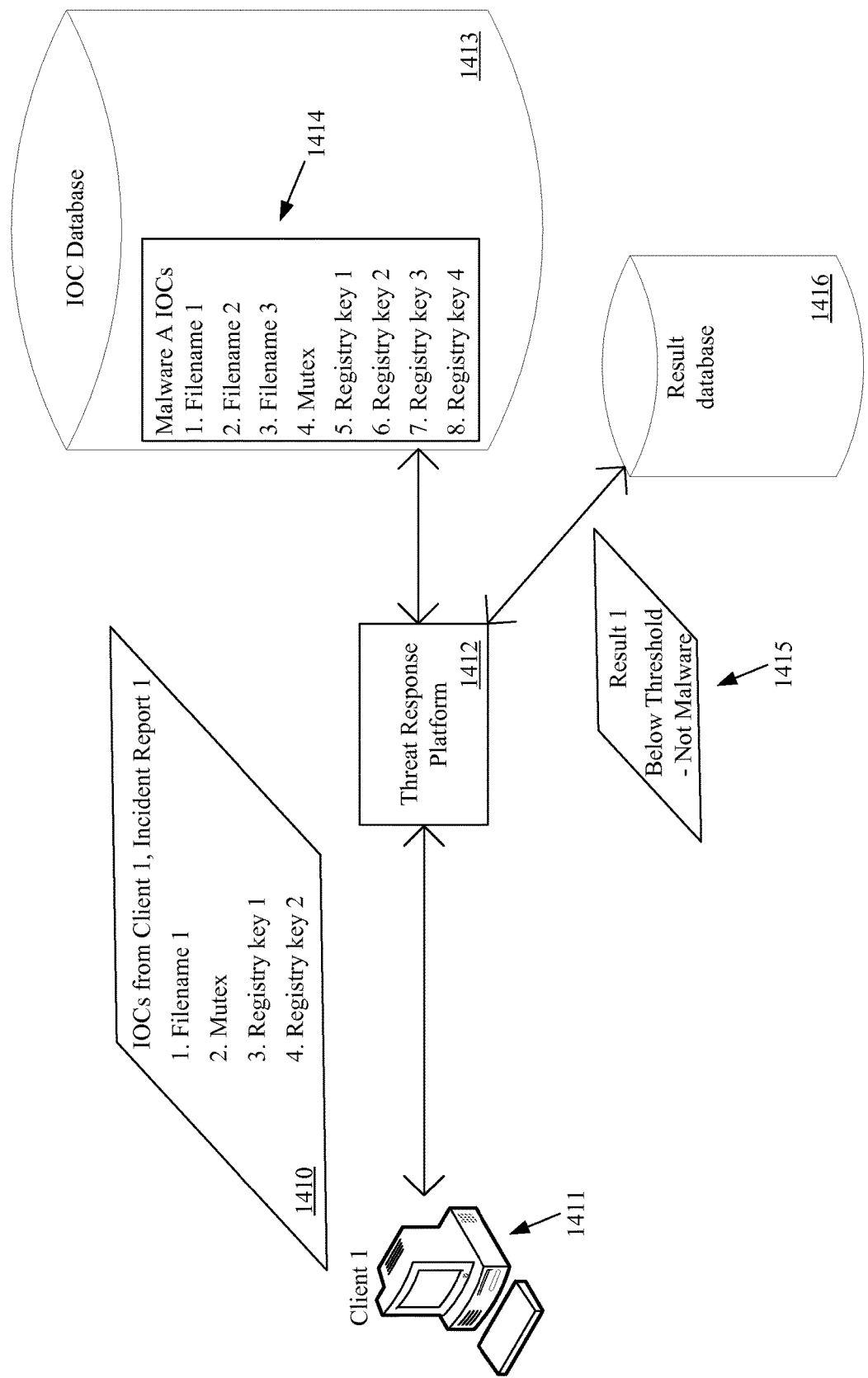
FIGS. 14A-14C conceptually illustrate an example of a threat response platform that correlates indications of compromise with malware and re-evaluates previous incident reports.
Figure 14B:
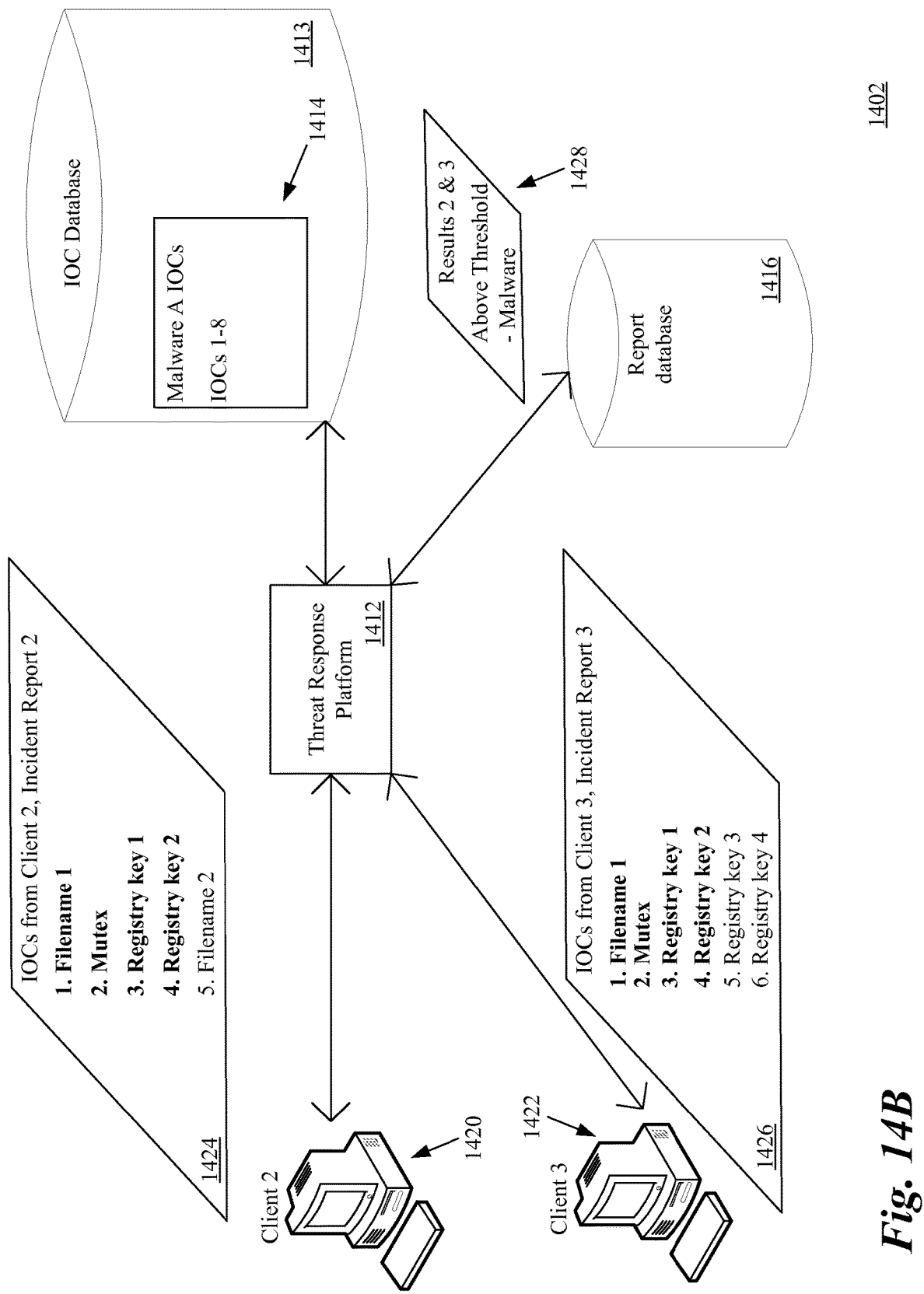
Figure 14C:
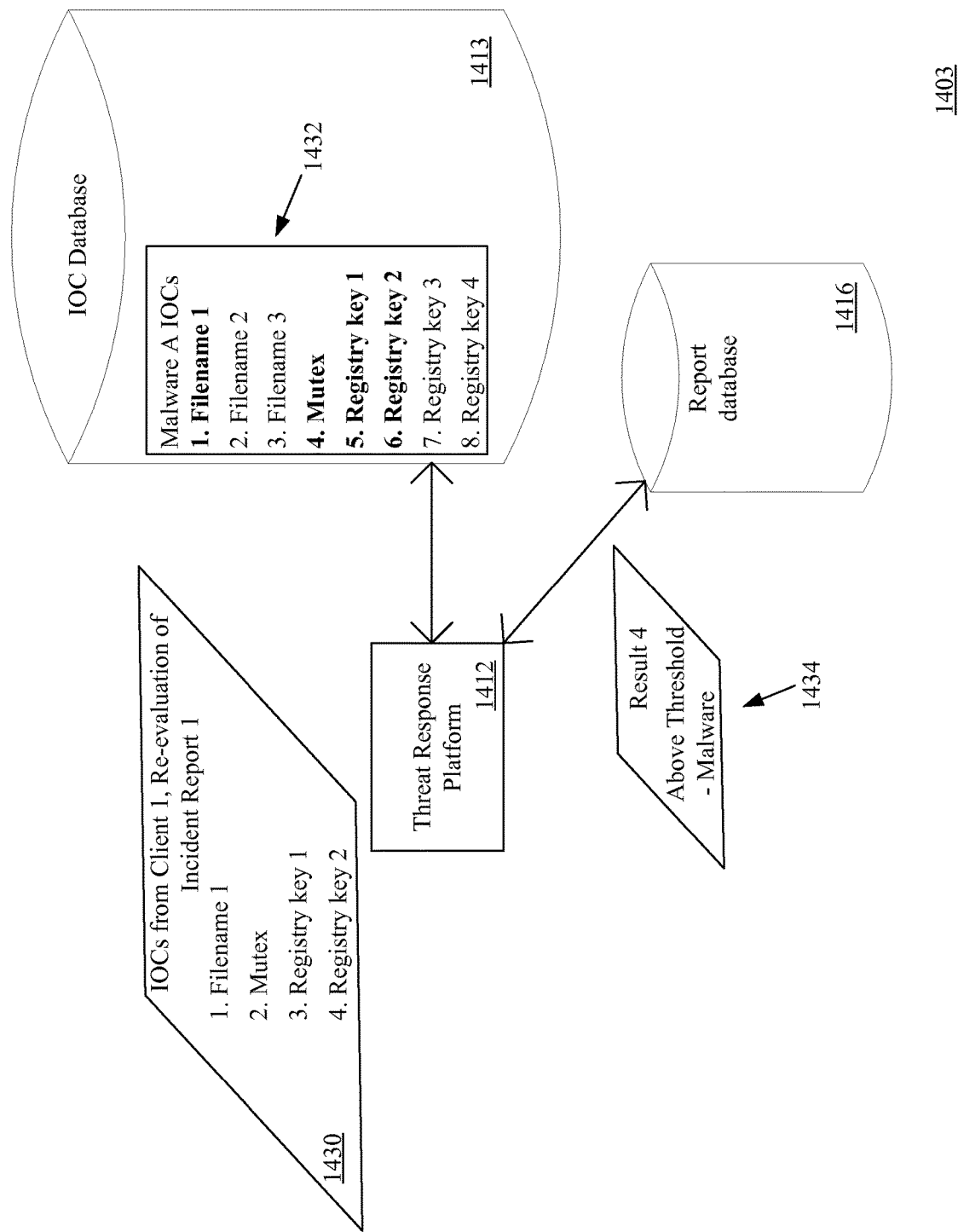

In some embodiments, the threat response platform identifies a strong correlation between a set of actual IOCs and the malware they relate to when the set of actual IOCs is present in multiple instances of that malware infecting client devices. The threat response platform then re-evaluates previous incident reports on the basis of the newly correlated actual IOCs. FIGS. 14A-14C conceptually illustrate an example of a threat response platform that correlates indications of compromise with malware and re-evaluates previous incident reports. In these figures, multiple incident reports are generated by the threat response platform. The threat response platform (either automatically or directed by a user) identifies the initial incident report as not indicating malware. The threat response platform (either automatically or directed by a user) then identifies later incident reports as indicating malware. The identification of the later incident reports as malware results in the threat response platform reweighting the actual indications of compromise found in one or multiple reports.

In the embodiments of FIGS. 14A-14C, after reweighting the actual indications of compromise, the threat response platform re-evaluates the initial incident report and determines that it does indicate malware. In some embodiments, the threat response platform will re-evaluate earlier reports, and change the determination of malware even when those reports were initially evaluated by a user. In some embodiments, the threat response platform will automatically re-evaluate earlier automatic evaluations, but will accept as authoritative a user's determination that an initial event does not indicate malware. In some such embodiments, reports that are automatically determined by the threat response platform to not indicate malware are re-evaluated, but reports determined by a user to not indicate malware are not re-evaluated at all. In other such embodiments, the threat response platform re-evaluates reports determined by a user to not indicate malware and presents the new results (in some embodiments, only when the new results differ from the previous determination) to the user to allow the user the option to change the determination in view of newly weighted evidence.

FIG. 14A, shows a first stage 1401 of a series of threat analysis actions by a threat response platform 1412. The figure includes potential IOCs 1410, a client device 1411, the threat response platform 1412, an IOC database 1413, including a set of actual IOCs that are evidence of a malware A 1414, evaluation result 1415, and result database 1416. As shown in FIG. 14A, in stage 1401, there is a collection of potential IOCs 1410 from a client device 1411. For the sake of space, the collection of potential IOCs from the client device 1411 is shown as including only the actual IOCs that match actual IOCs of malware A 1414, found in database 1413. However, in some embodiments, an agent on a client device finds many more potential indications of compromise and sends all of them to the threat response platform 1412 for evaluation.

The threat response platform 1412 compares the potential IOCs 1410 against a set of actual IOCs (e.g., in an IOC database 1413). Among the actual IOCs in the IOC database 1413 are the actual IOCs that are evidence of malware A 1414. There are 8 actual IOCs that are evidence of malware A 1414 according to database 1413. The threat response platform 1412 finds 4 matches between the potential IOCs 1410 and the actual IOCs of malware A 1414. The threat response platform 1412 initially determines that those 4 matches are not enough to indicate malware. In some embodiments, this determination is based on one of (1) a user's personal determination that the 4 matching actual IOCs are not enough to indicate malware or (2) an automatic determination by the threat response platform 1412 that the 4 matching actual IOCs are not enough to indicate malware. In some embodiments, the automatic determination is based on whether the found actual IOCs (and/or other collected data) indicate malware beyond a threshold probability. In some embodiments, values used to determine the probability of malware are set by a user, set by a central authority (e.g., a network based service), or set by machine learning based on previous determinations by the user and/or the central authority. In some embodiments, the incident report and the resulting finding of "not malware" are stored in result database 1416 as results 1415.

In some embodiments, if the user directly determines that the 4 matching actual IOCs are not enough to indicate malware, then the threat response platform 1412 does not later re-evaluate the potential IOCs 1410 regardless of later re-weighting of the actual IOCs in the IOC database 1413. In other embodiments, the threat response platform 1412 re-evaluates the potential IOCs 1410 after it re-weights the actual IOCs in IOC database 1413. In some such embodiments, the threat response platform 1412 presents new results to the user for confirmation or rejection. In other such embodiments, the threat response platform automatically changes the determination when indicated by the re-weighted actual IOCs.

FIG. 14B, shows stage 1402 of the evaluations. This figure includes client devices 1420 and 1422, potential IOCs 1424 and 1426, and evaluation results 1428. In this stage 1402, the threat response platform 1412 has placed agents on client devices 1420 and 1422 (e.g., in response to other event reports from a threat detector). These agents collect potential IOCs 1424 and 1426 from client devices 1420 and 1422, respectively. When the threat response platform 1412 compares the potential IOCs 1420 and 1422 against the actual IOCs for malware A 1414, the threat response platform finds 5 or 6 matches. The threat response platform 1412 initially determines that those 5-6 matches are enough to indicate malware. In some embodiments, this determination is based on one of (1) a user's personal determination that the 5-6 matching actual IOCs are enough to indicate malware or (2) an automatic determination by the threat response platform 1412 that the 5-6 matching actual IOCs are enough to indicate malware (e.g., the 5-6 actual IOCs satisfy a confidence threshold previously set by the user or generated from earlier results). In some embodiments, the incident report and the resulting findings of "malware" are stored in result database 1416 at results 1428.

In some embodiments, if the user directly determines whether or not the 5-6 matching actual IOCs are enough to indicate malware, then the threat response platform 1412 will re-weight the actual IOCs, but if the threat response platform 1412 automatically determines whether or not the 5-6 matching actual IOCs are enough to indicate malware, the threat response platform 1412 will not re-weight the actual IOCs. In other embodiments, the threat response platform 1412 will re-weight the IOCs whether the user makes the determination or the threat response platform 1412 makes the determination.

In some embodiments, after the threat response platform 1412 has identified multiple reports of incidents as caused by malware, there is enough data to establish what is common between those detections of the particular malware. In this example, what is found is that both identified detections of that particular malware have the same 4 matches (i.e., filename 1, mutex, registry key 1, and registry key 2) against the potential IOCs. As used herein, these 4 actual IOCs are referred to variously as "always matching" or "common IOCs". Other actual IOC criteria (e.g., filename 2 and registry key 3) match for some actual IOC data collections that indicate malware, but not all. The embodiment illustrated in FIG. 14B includes 2 identified incidents of malware. However, in other embodiments, more than 2 incidents are correlated to determine common matches. Furthermore, in some embodiments, the threat response platform may identify a particular collection of actual IOCs as more significant than others even if not all actual IOCs of that particular collection are found in every identified incident of that malware. For example, if every identified incident of that malware includes 3 out of a set of 4 actual IOCs, the threat detection platform may identify those 4 actual IOCs as more significant than actual IOCs less commonly associated with such incidents.

FIG. 14C, shows stage 1403 of the evaluations. This figure includes potential IOCs 1430 in a re-evaluation of incident report 1, updated actual IOCs of malware A 1432, and evaluation results 1434. The threat response platform 1412 finds that the 4 always matching actual IOCs are present (out of 8). Accordingly, in stage 1403, the threat response platform 1412 has updated the actual IOCs of malware A 1432 to indicate that the 4 particular actual IOCs found as the common denominator of actual IOCs 1424 and 1426 in FIG. 14B are particularly significant in identifying the presence of malware A 1432.

In the figure, the increased weighting of the 4 common actual IOCs (i.e., filename 1, mutex, registry key 1, and registry key 2) is indicated by those actual IOCs appearing in bold text in the IOC database 1413 of FIG. 14C. However, in some embodiments, the new weighting of the actual IOCs may be stored in the results database 1416 or another database rather than the IOC database 1413.

After the threat response platform 1412 establishes that the 4 specific actual IOCs are the most predictive of real malware, the threat response platform 1412 rechecks the collection of potential IOCs 1430 (i.e., the potential IOCs 1410 of FIG. 14A) against the 4 always matching actual IOCs. Even though the 4 actual IOCs were previously not enough for the threat response platform 1412 to classify the original incident report as indicating malware, the fact that these 4 actual IOCs have been identified as common denominators of the malware infections (or in some embodiments, strongly correlated with the malware infections) will cause the threat response platform to re-classify the original incident report as identifying a malware infection (e.g., in evaluation result 1434). The threat response platform 1412 of some embodiments would then take the automatic action prescribed for that malware and inform the user of the re-classification. In other embodiments, the threat response platform 1412 would inform the user of the reweighted evidence and allow the user to determine whether the reweighted evidence was an indication of malware A.

As mentioned previously, the threat response platform of some embodiments can reweight the evidentiary value of a particular actual IOC even if that actual IOC is not found in all identified incidents of that malware. In some embodiments, a strong correlation between a particular actual IOC and the particular malware is enough for the threat response platform to reweight that actual IOC when evaluating an incident to determine whether that malware is present. Similarly, in some embodiments, the threat response platform also decreases the weight of a particular actual IOC if the particular actual IOC is determined to not be correlated with a particular malware.

VI. Computer System

Figure 15:
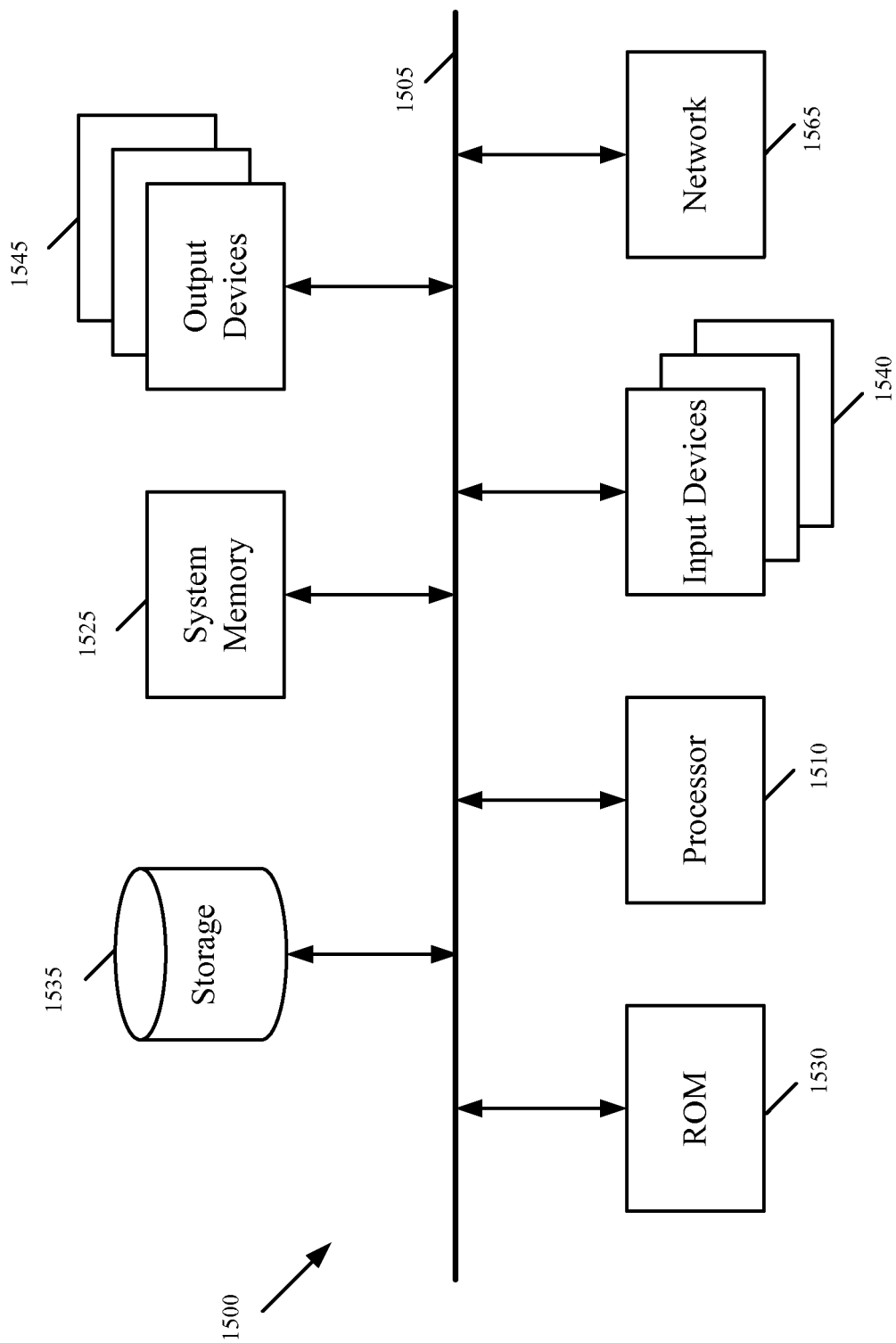
FIG. 15 conceptually illustrates an example of an electronic system with which some embodiments of the invention are implemented.

In some embodiments, the threat response platform is software running on an electronic system. FIG. 15 conceptually illustrates an example of an electronic system 1500 with which some embodiments of the invention are implemented. The electronic system 1500 may be a computer (e.g., a desktop computer, personal computer, tablet computer, etc.), implemented in hardware, on virtualized hardware, or any other sort of electronic or computing device. Such an electronic system includes various types of computer readable media and interfaces for various other types of computer readable media. Electronic system 1500 includes a bus 1505, processing unit(s) 1510, a system memory 1520, a network 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1520, and the permanent storage device 1535.

From these various memory units, the processing unit(s) 1510 retrieves instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash memory device, etc., and its corresponding drive) as the permanent storage device. Like the permanent storage device 1535, the system memory 1520 is a read-and-write memory device. However, unlike storage device 1535, the system memory 1520 is a volatile read-and-write memory, such a random access memory. The system memory 1520 stores some of the instructions and data that the processor needs at runtime. In some embodiments, the invention's processes are stored in the system memory 1520, the permanent storage device 1535, and/or the read-only memory 1530. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alphanumeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While various processes described herein are shown with operations in a particular order, one of ordinary skill in the art will understand that in some embodiments the orders of operations will be different. For example, the process 1200 of FIG. 12 is shown as retrieving reports from a database, then determining whether to re-evaluate the reports. However, in some embodiments, the threat response platform pro-actively removes reports from the report database if there is a reason not to re-evaluate them (e.g., they are too old, the client device they report on has been re-imaged, etc.).

What is claimed is:

1. A method for threat detection and response, the method comprising:
   receiving, by a threat response computer from a threat detector running on a client computer in an enterprise computing network wherein the client computer is separate from the threat response computer, an event report identifying a suspicious communication over a network between the client computer and a network device other than the client computer;
   automatically remotely activating, by the threat response computer, a data collector on the client computer, the data collector configured for searching potential indications of compromise (IOCs) on the client computer and sending data identifying the potential IOCs to the threat response computer for evaluation;
   receiving, by the threat response computer from the data collector, the data identifying the potential IOCs on the client computer;
   comparing, by the threat response computer, the potential IOCs on the client computer and IOCs in a database local to the threat response computer;
   based at least in part on the comparing, determining, by the threat response computer, whether the potential IOCs on the client computer indicate evidence of malware on the client computer; and
   responsive to the evidence of malware on the client computer, sending an instruction from the threat response computer to configure a firewall in the enterprise computing network.

2. The method according to claim 1, wherein the IOCs in the database indicate evidence of actual malware or evidence of potential malware.

3. The method according to claim 1, wherein the IOCs in the database are provided by multiple sources including anti-malware programs, a central database of IOCs, or a user of the threat response computer.

4. The method according to claim 1, wherein sending an instruction from the threat response computer to configure a firewall in the enterprise computing network further comprises sending an instruction to the firewall to block or reroute the suspicious network communication.

5. The method according to claim 1, further comprising:
   responsive to the evidence of malware on the client computer, automatically commanding the firewall to add an Internet Protocol address of the network device to a blocked list maintained by the firewall, the automatically commanding being performed by the threat response computer.

6. The method according to claim 1, further comprising:
   responsive to the evidence of malware on the client computer, instructing the firewall to selectively block computers in the enterprise computing network from accessing an Internet Protocol address, a hostname, or a universal resource locator of the network device, the instructing being performed by the threat response computer.

7. The method according to claim 6, wherein the instructing further comprises:
   commanding the firewall to route access requests to the network device to the threat response computer, the commanding being performed by the threat response computer;
   providing, by the threat response computer, a test to the client computer to determine whether a human or an automated system is attempting to connect the client computer to the network device; and
   determining, by the threat response computer depending upon an outcome from the test, whether to allow or block the suspicious network communication.

8. The method according to claim 1, further comprising:
   receiving, by the threat response computer from a network based service, the IOCs or an instruction on how to respond to an IOC of the potential IOCs on the client computer.

9. The method according to claim 1, further comprising:
   presenting, by the threat response computer to a user through a user interface, the evidence of malware determined by the threat response computer; or
   responsive to a request from the user, presenting, by the threat response computer to the user through the user interface, the potential IOCs found by the data collector on the client computer.

10. The method according to claim 1, further comprising:
    providing, by the threat response computer to a user through a user interface, data that allows the user to determine whether the event report is a false positive or an actual indication of malware.

11. A system for threat detection and response, the system comprising:
    a processor;
    a non-transitory computer-readable medium; and
    stored instructions translatable by the processor for:
    receiving, from a threat detector running on a client computer in an enterprise computing network wherein the client computer is separate from the threat response computer, an event report identifying a suspicious communication over a network between the client computer and a network device;
    automatically remotely activating a data collector on the client computer, the data collector configured for searching potential indications of compromise (IOCs) on the client computer and sending data identifying the potential IOCs to the system for evaluation;
    receiving, from the data collector, the data identifying the potential IOCs on the client computer;
    comparing the potential IOCs on the client computer and IOCs in a database local to the system;
    based at least in part on the comparing, determining whether the potential IOCs on the client computer indicate evidence of malware on the client computer; and
    responsive to the evidence of malware on the client computer, sending an instruction to configure a firewall in the enterprise computing network.

12. The system of claim 11, wherein the IOCs in the database indicate evidence of actual malware or evidence of potential malware.

13. The system of claim 11, wherein the IOCs in the database are provided by multiple sources including anti-malware programs, a central database of IOCs, or a user of the system.

14. The system of claim 11, wherein sending an instruction to configure a firewall in the enterprise computing network further comprises sending an instruction to the firewall to block or reroute the suspicious network communication.

15. The system of claim 11, wherein the stored instructions are further translatable by the processor for:
responsive to the evidence of malware on the client computer, automatically commanding the firewall to add an Internet Protocol address of the network device to a blocked list maintained by the firewall.

16. The system of claim 11, wherein the stored instructions are further translatable by the processor for:
responsive to the evidence of malware on the client computer, instructing the firewall to selectively block computers in the enterprise computing network from accessing an Internet Protocol address, a hostname, or a universal resource locator of the network device.

17. The system of claim 16, wherein the instructing further comprises:
commanding the firewall to route access requests to the network device to the system;
providing a test to the client computer to determine whether a human or an automated system is attempting to connect the client computer to the network device; and
determining, depending upon an outcome from the test, whether to allow or block the suspicious network communication.

18. The system of claim 11, wherein the stored instructions are further translatable by the processor for:
receiving, from a network based service, the IOCs or an instruction on how to respond to an IOC of the potential IOCs on the client computer.

19. The system of claim 11, wherein the stored instructions are further translatable by the processor for:
presenting, to a user through a user interface, the evidence of malware determined by the system; or
responsive to a request from the user, presenting, to the user through the user interface, the potential IOCs found by the data collector on the client computer.

20. The system of claim 11, wherein the stored instructions are further translatable by the processor for:
providing, to a user through a user interface, data that allows the user to determine whether the event report is a false positive or an actual indication of malware.

* * * * *